（12） United States Patent
Woodgate et al.

(10) Patent No.: US 6,595,648 B1
(45) Date of Patent: Jul. 22, 2003

(54) PROJECTION DISPLAY

(75) Inventors: Graham John Woodgate, Oxfordshire (GB); Marina Khazova, Oxfordshire (GB); Duncan James Anderson, Tarrytown, NY (US)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/701,397

(22) PCT Filed: Jun. 3, 1999

(86) PCT No.: PCT/JP99/02959
§ 371 (c)(1),
(2), (4) Date: Mar. 30, 2001

(87) PCT Pub. No.: WO99/63395
PCT Pub. Date: Dec. 9, 1999

(30) Foreign Application Priority Data

Jun. 3, 1998 (GB) .............................................. 9811782

(51) Int. Cl.[7] .............................................. G03B 21/14
(52) U.S. Cl. .......................... 353/122; 353/98; 359/15; 359/16
(58) Field of Search .............................. 353/20, 38, 63, 353/65, 66, 122, 98; 349/5, 6, 7, 113; 359/10, 11, 15, 16, 19, 32, 33

(56) References Cited

U.S. PATENT DOCUMENTS

| 5,321,789 | A | | 6/1994 | Kida et al. ................. 385/133 |
|---|---|---|---|---|
| 5,389,982 | A | | 2/1995 | Lee .............................. 353/37 |
| 5,608,552 | A | * | 3/1997 | Smith ............................ 349/5 |
| 5,663,816 | A | | 9/1997 | Chen et al. .................... 359/15 |
| 5,801,793 | A | | 9/1998 | Faris et al. .................... 349/5 |
| 6,359,719 | B1 | * | 3/2002 | Ori .............................. 359/242 |

FOREIGN PATENT DOCUMENTS

| EP | 0 811 859 A2 | 12/1997 |
|---|---|---|
| EP | 0 826 986 A1 | 3/1998 |
| JP | 09-281477 | 10/1997 |
| WO | 95/12826 | 5/1995 |
| WO | 96/12210 | 4/1996 |

OTHER PUBLICATIONS

International Search Report, Application No. PCT/JP99/02959, dated Oct. 18, 1999.

European Examination Report, Application NO. 99 923 876.9–2205, dated Apr. 30, 2001.

Mehta, P. & Rampal, V.; "Laser and Holography"; *World Scientific;* 1993, pp. 517–519, 522–523.

* cited by examiner

*Primary Examiner*—William Dowling
(74) *Attorney, Agent, or Firm*—Renner, Otto, Boisselle & Sklar

(57) ABSTRACT

A projection display comprising: a transmissive spatial light modulator (10); an illuminator (1, 20, 21, 30) for illuminating the modulator from the front thereof; and a hologram (32) disposed at the rear of the modulator for imaging and reflecting back through the modulator light from the illuminator received through the modulator.

35 Claims, 25 Drawing Sheets

(thickness of order 5um)

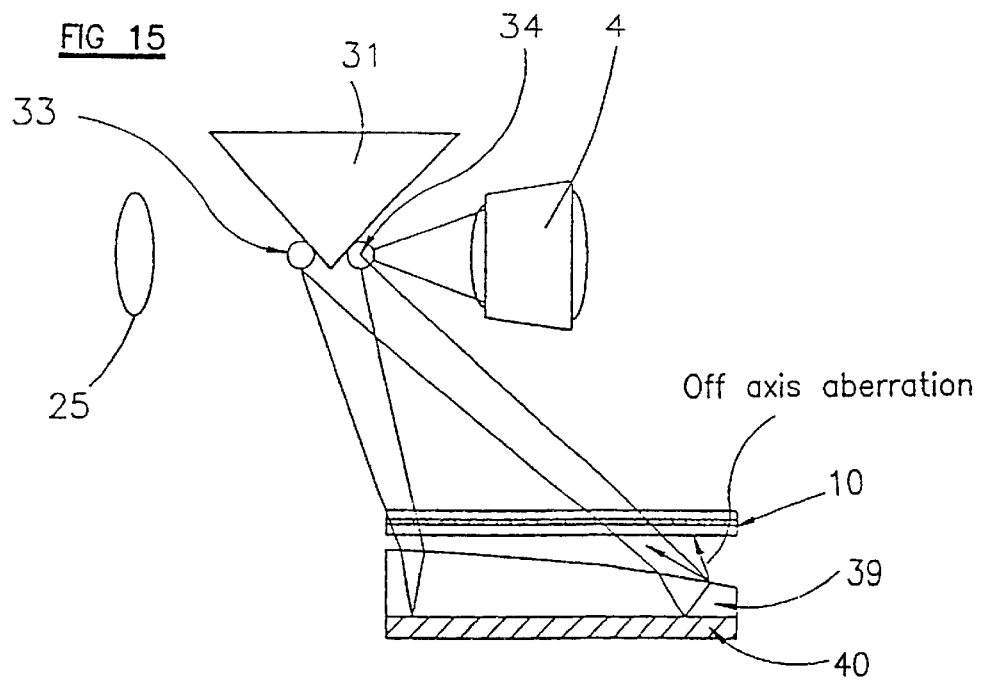
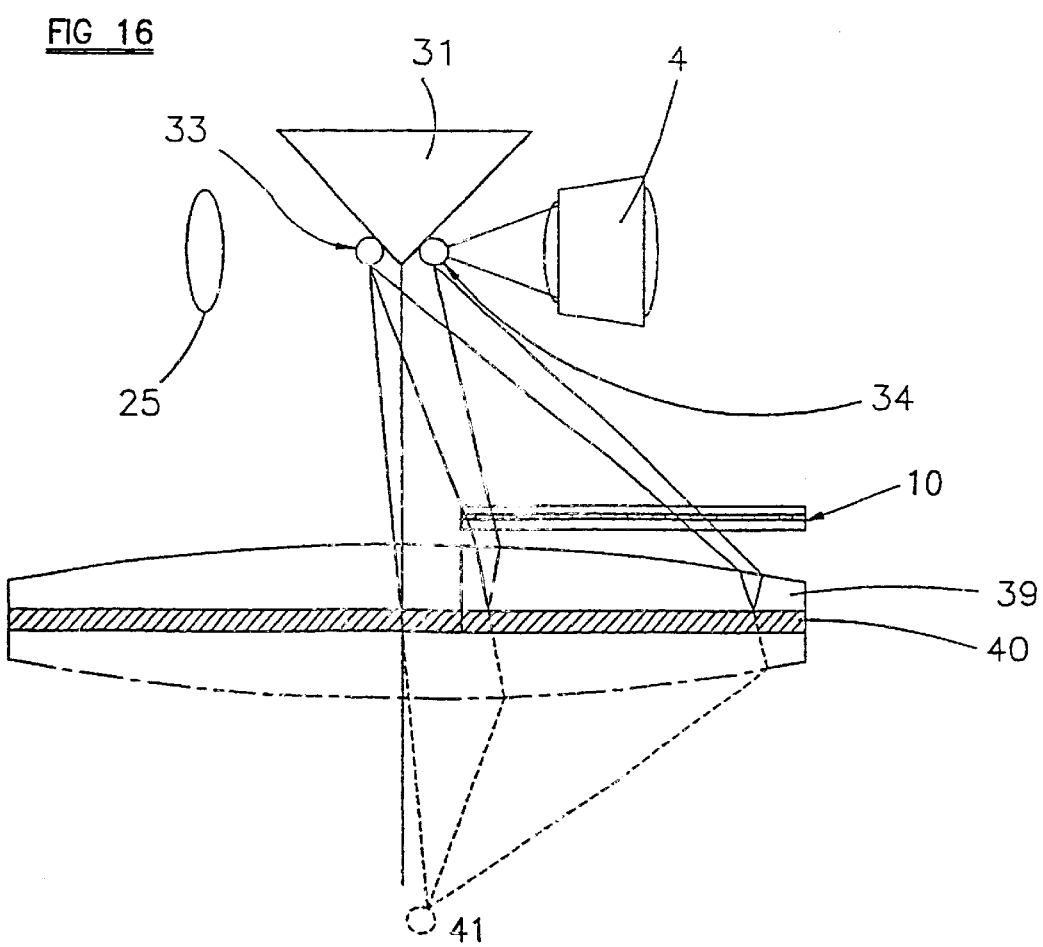

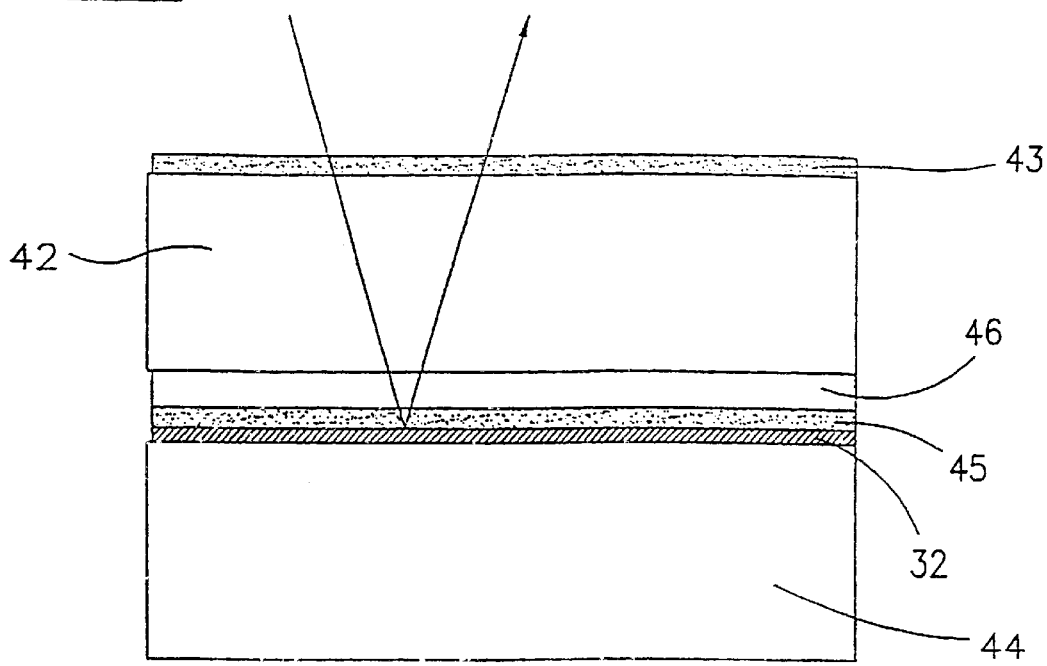

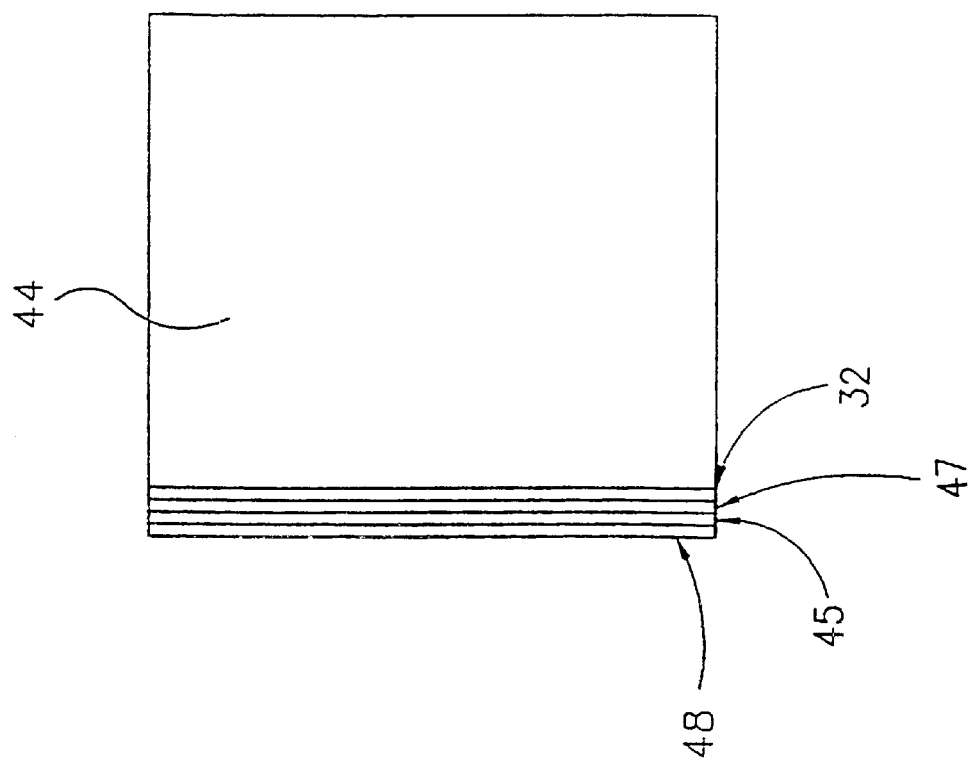
FIG. 18
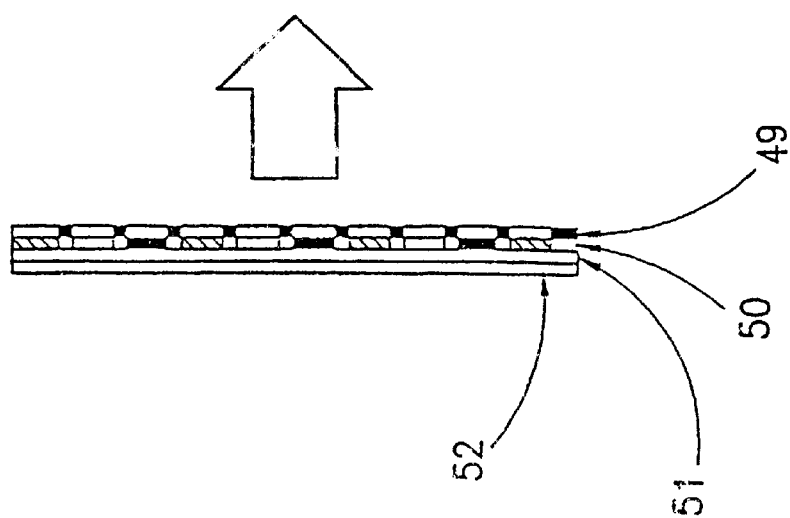

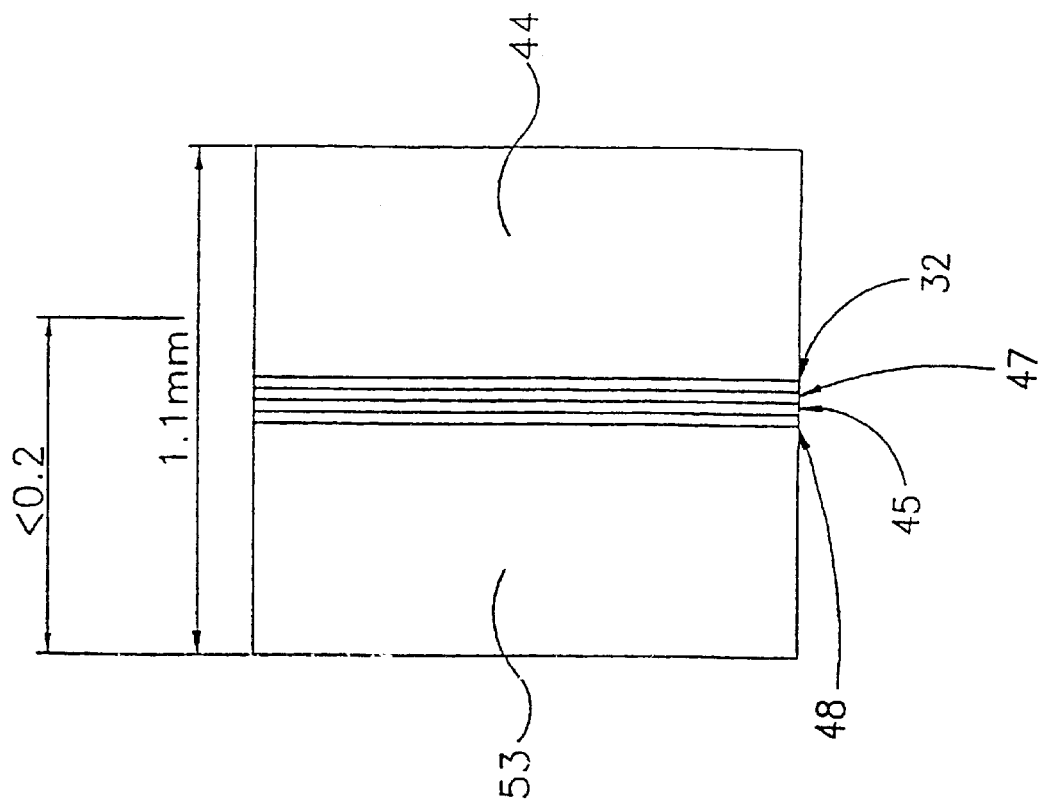
FIG 19
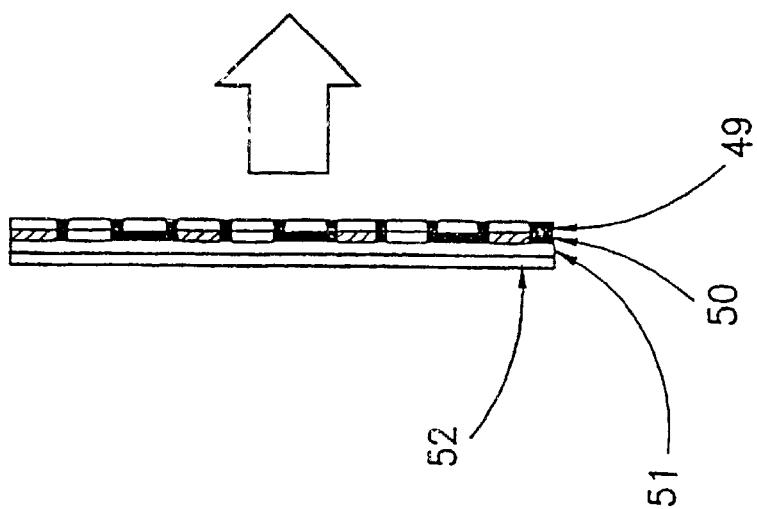

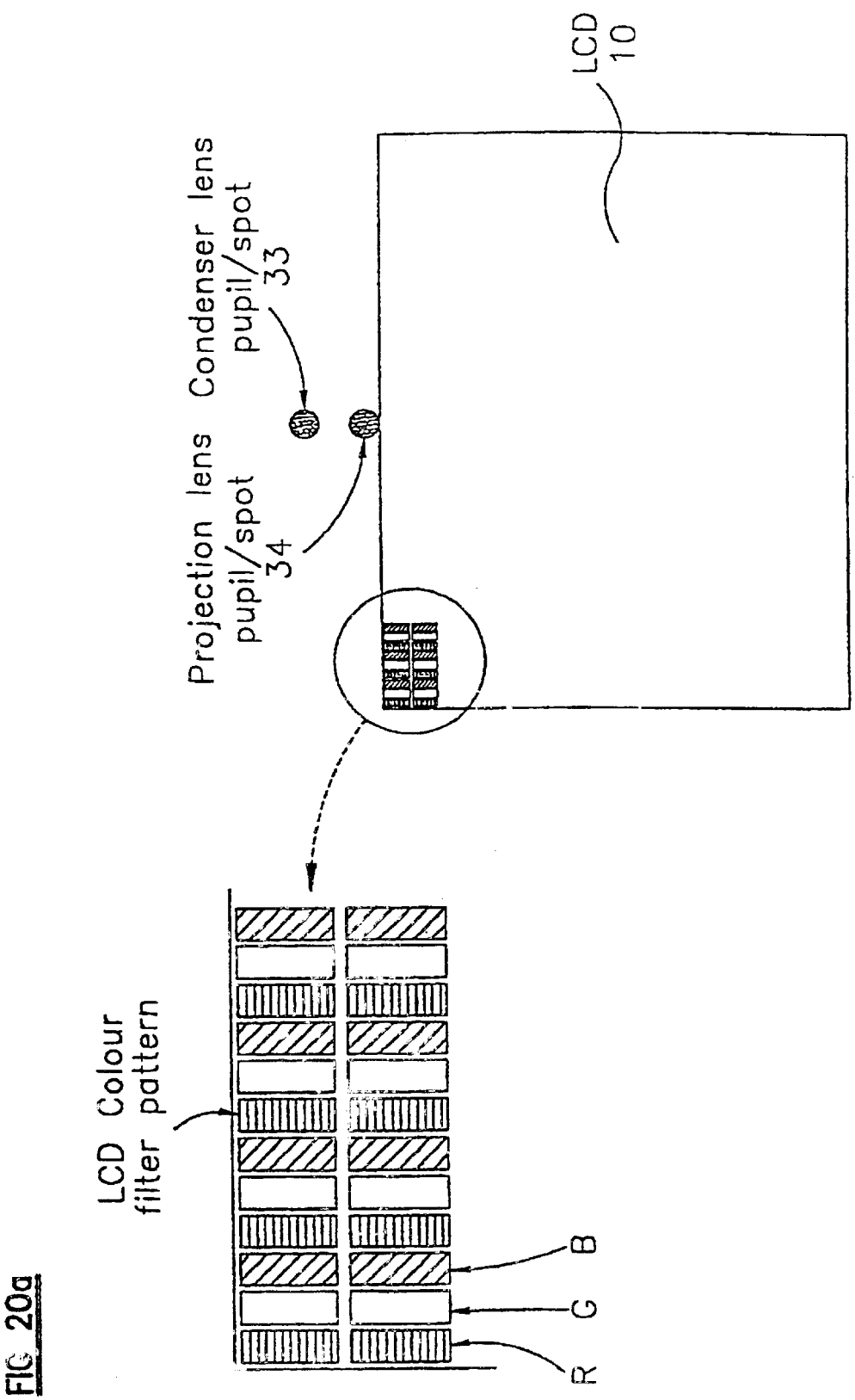

Plan view

Hologram reflectivity

Data content:

Pixel processor:

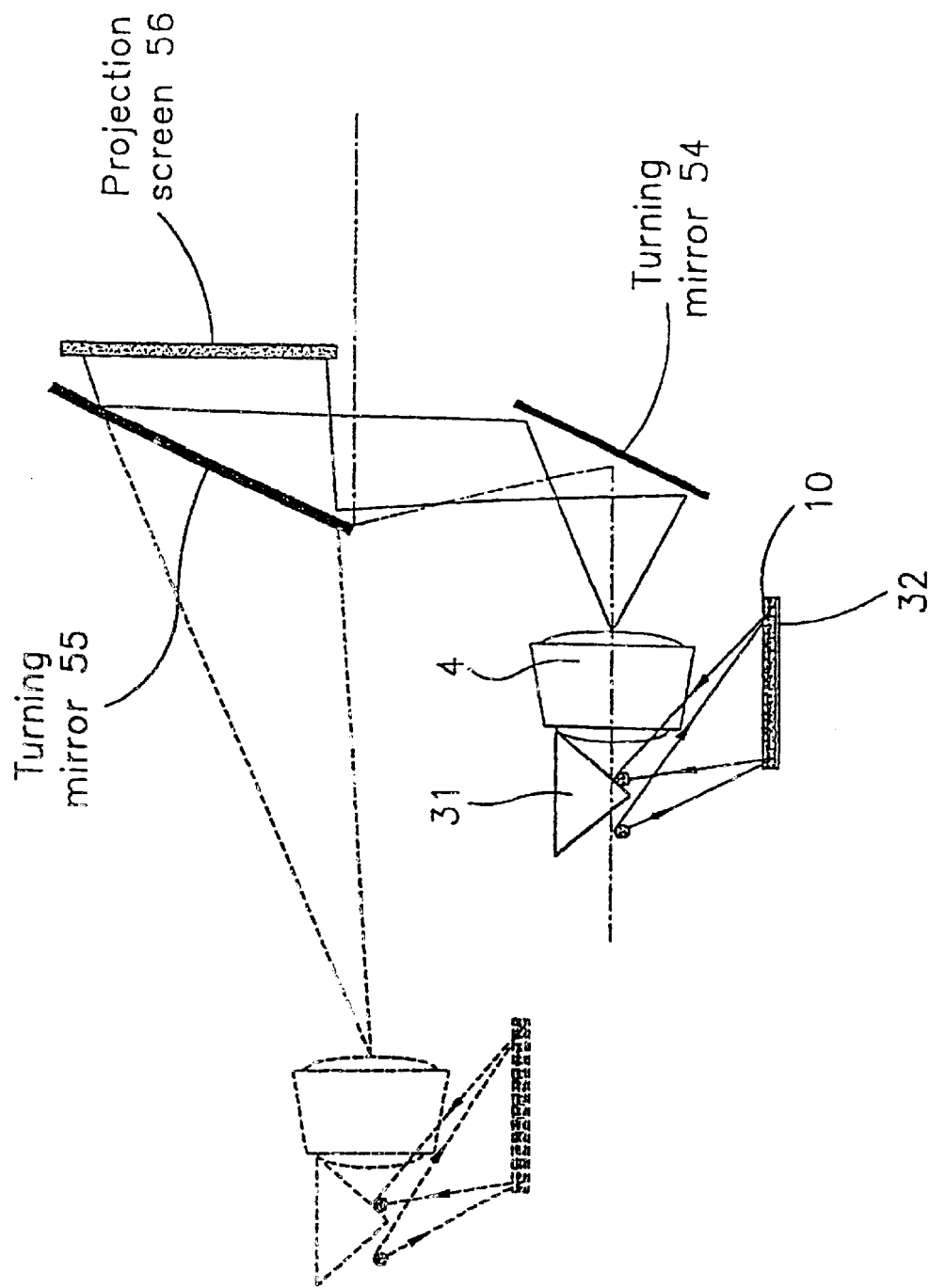

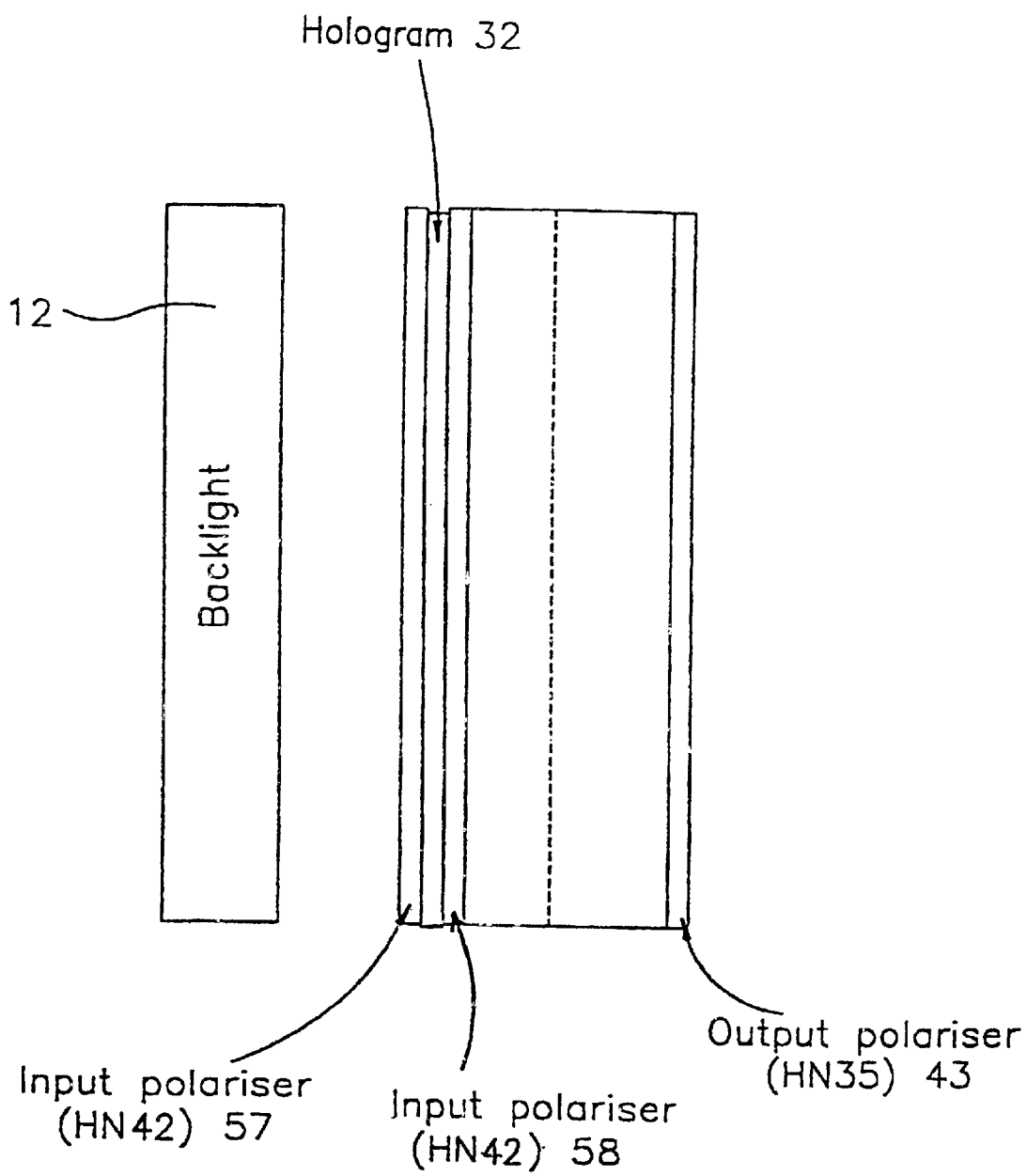

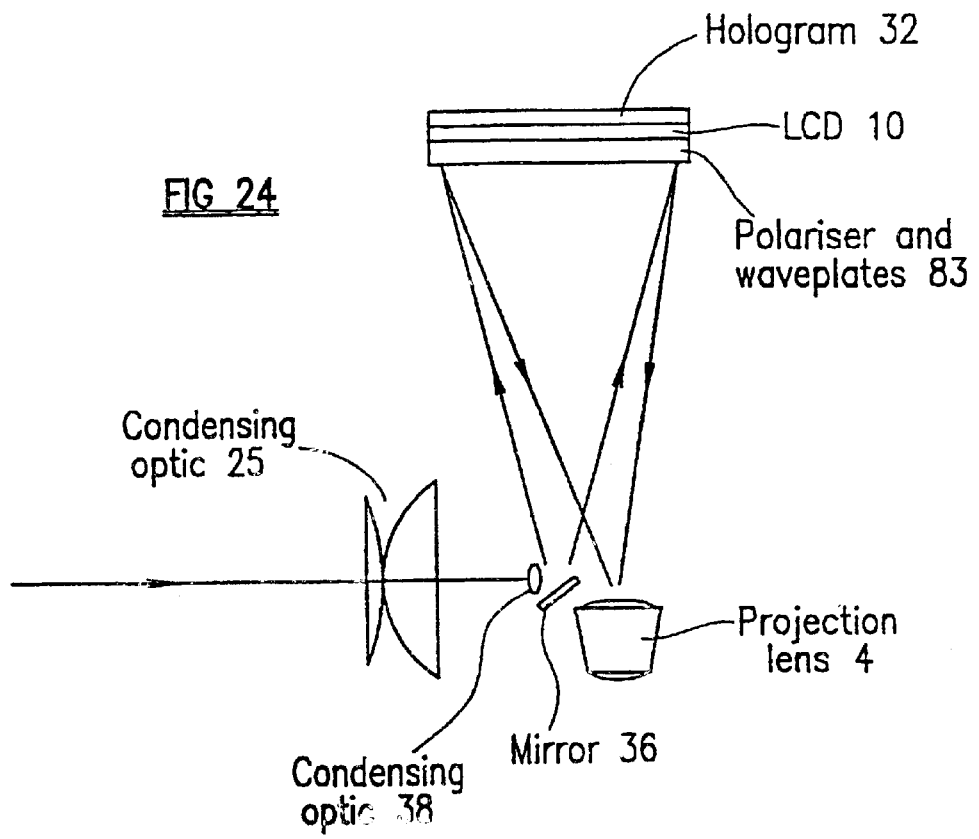

FIG 29a
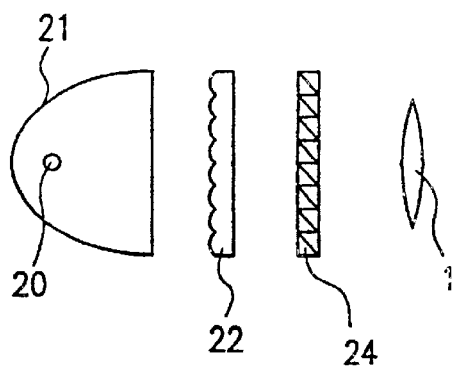
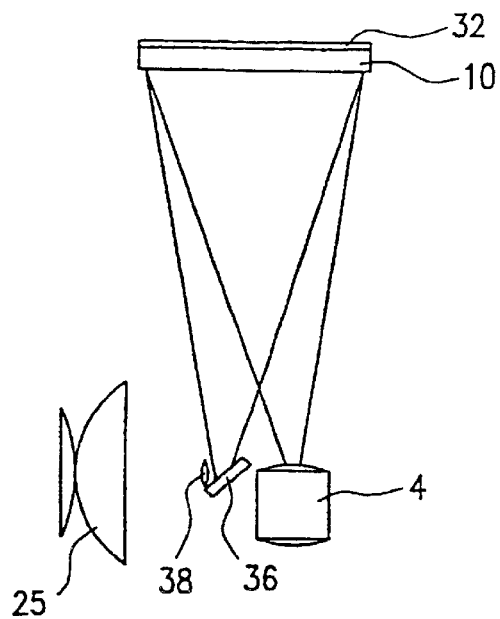
FIG 29b
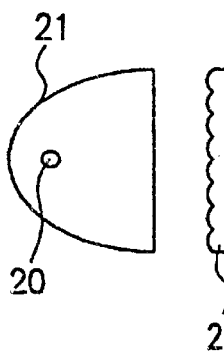
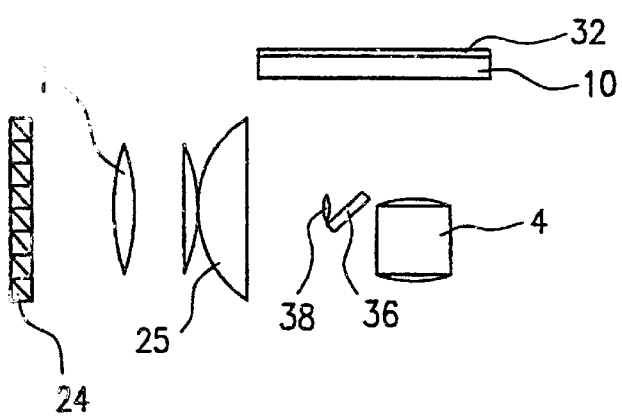

PROJECTION DISPLAY

TECHNICAL FIELD

The present invention relates to a projection display. Such a display may be in the form of a compact convertible projector for displaying enlarged images from conventional direct view spatial light modulators, such as liquid crystal devices, for multiple viewers. Displays of this type have uses in portable office equipment, desktop office equipment, television equipment and display presentations.

BACKGROUND ART

U.S. Pat. No. 5,629,806 discloses a display system for providing private viewing and for displaying a relatively large image from a small direct view image source. The system comprises an image source such as a cathode-ray tube, electro-luminescent display or direct view liquid crystal display (LCD), focusing, conjugating and folding optics. The conjugating optics include a retro-reflector and a beam-splitter.

U.S. Pat. No. 5,418,584 discloses a retro-reflective array projection screen for displaying virtual images. The screen comprises a large collimating element and an array of small retro-reflective elements for reflecting the projected image back to an external exit pupil. The retro-reflective elements are of the diffractive type with a rear mirror for reflecting light back through the diffractive element. This system is also provided for private viewing.

FIG. 1 illustrates a known type of overhead projector of the reflection type for images fixed on transparencies. A projection light source including a condensing optic 1 illuminates a transparency 2 which is placed on a reflective Fresnel lens 3. The axis of the lens 3 is laterally spaced from the axis of the condensing optic 1 so that the lens 3 images the illuminator at a projection lens 4, which is laterally spaced from the condensing optic 1. A folding mirror 5 directs light onto a projection screen (not shown).

U.S. Pat. No. 5,132,823 discloses a multipurpose LCD suitable for use as a reflective display and overhead projection panel. The LCD comprises a liquid crystal layer which is PIXELLATEd with the picture elements (pixels) being switchable between high and low scattering states. The LCD is disposed on top of a removable corner cube retro-reflector. The retro-reflector is used to improve the image contrast.

U.S. Pat. No. 5,353,075 discloses an arrangement which is convertible between direct view operation and overhead projection operation. For direct view operation, an LCD is disposed over a backlight. For projection operation, the LCD is used in place of a transparency in a conventional projection display.

U.S. Pat. No. 5,668,695 discloses a portable computer whose main body and lid are linked together and which may be used with a conventional overhead projector.

U.S. Pat. No. 5,593,221 discloses the use of an LCD as a projection transparency for a conventional type of overhead projector.

Engberg S. J., "Holographic techniques change shape of retro-reflectors", Euro Photonics, December/January, 1998, p 37–38 and Hardin R. W., "Diffraction brings street signs to life", Photonics Spectra, December, 1997, p 40 disclose broadband diffractive retro-reflectors in the form of diffractive Fresnel zone plates for creating light sources on the front surface of a retro-reflector with textured back reflective surface to produce semi-Lambertian scatter to improve the acceptance angle.

U.S. Pat. No. 5,515,354 discloses the use of a diffractive retro-reflector in an optical pick up in the form of a blazed diffraction grating with a reflective film on its rear surface.

U.S. Pat. No. 5,801,793 discloses an LCD which has a removable backlight so that the LCD may be used in direct view and projection modes.

Gallagher T., "Standard registration mark-please", Holography News, vol. 11, no. 5, p. 4, 1997 discloses the use of a holographic retro-reflection registration mark for use in precise positioning of embossed holograms in the printing industry. In particular, an embossed transparent plastic hologram having a rear metal reflecting layer is disclosed.

Ralli P. J. and Wenyon M. M., "Imagix(™) holographic diffusers for reflective liquid crystal displays", SID 96 disclose the use of a holographic reflector made of a photopolymer with an STN backlit display device to allow such a device to be used with ambient overhead illumination. FIG. 2a illustrates such an arrangement in the direct view mode whereas FIG. 2b illustrates such a system in the reflection mode.

As shown in FIG. 2a, a transmission mode LCD 10 is disposed above a holographic reflector 11, which is disposed above a backlight 12. In the backlight mode, the backlight 12 is illuminated and directs light 16 through the holographic reflector 11, which has no visible effect, and the LCD 10 towards an observer whose eye is shown at 14.

In the reflection mode illustrated in FIG. 2b, the LCD 10 is illuminated from a suitable light source to provide the overhead illumination 13 within a predetermined acceptable angle of the holographic reflector 11. Provided the illumination occurs within the acceptance angle; the holographic reflector 11 acts as a reflector and directs diffracted light 18 back through the LCD 10 towards the eye 14 of the observer. The holographic reflector 11 may also work in association with a diffuse rear metallic reflector 17.

FIG. 3 illustrates a conventional projection display using a transmission mode LCD 10. An illuminator comprises a light emitter in the form of a lamp 20 and collecting optics shown as a parabolic mirror 21. The resulting collimated light beam is supplied to an homogeniser comprising a first homogeniser lens array 22 and a second homogeniser lens array 23. Light from the homogeniser is passed to an array of polarisation beam splitter cubes and half-waveplate strips 24, a first condensing optic 1 and a second condensing optic 25.

Light from the light source illuminates the LCD 10 and is modulated by the displayed image. The output light is supplied to a projection lens 4 which projects an enlarged image onto a front-projection or back-projection screen (not shown). The collecting optics 21 illuminate the first homogeniser lens array 22 with collimated light from the lamp 20. The array 22 produces an image of the light source formed by the lamp 20 and the collecting optics 21 at each of the lenses of the second homogeniser lens array 23. The lens array 23 and the first condensing optic 1 produce an image of each of the lenses of the array 22 at the plane of the LCD 10. The polarisation recirculation cubes in conjunction with the array of half-waveplates 24 convert the polarisation so that all of the light supplied to the LCD 10 is of the same linear polarisation. Images of the array 22 at the plane of the LCD 10 are overlaid by means of the first condensing optic 1. The second condensing optic 25 forms an image of the light source at the entrance pupil of the projection lens 4, which images the LCD 10 at the screen.

FIG. 4 illustrates a known type of projection display using telecentric imaging to avoid the need for a field lens such as 25. The display shown in FIG. 4 uses a reflection-mode LCD 10 provided with a rear metallic plane reflector internal to the liquid crystal layer and has a folded optical path provided by a turning beam splitter 26 which may be a polarising beam splitter.

The illuminator shown in FIG. 4 is of the same type as shown in FIG. 3. Light from the condensing optic 1 is reflected by the beam splitter 26 onto the LCD. Light passes through the LCD in accordance with the modulation by the displayed image and is reflected back through the LCD 10 by the rear metallic reflector. However, the output light from the LCD has a greater spread than systems based on field lenses and, after passing through the beam splitter 26, requires that the projection lens 4 have a greater input aperture size than the size of the LCD.

U.S. Pat. No. 5,663,816 discloses an arrangement which is similar to that shown in FIGS. 2a and 2b of the accompanying drawings.

WO 95/12826 discloses a reflective liquid crystal display which is illuminated by ambient light. The display has a rear holographic reflector which redirects the diffracted light away from the specular reflection direction so as to improve display brightness.

U.S. Pat. No. 5,389,982 discloses a projection display which uses three liquid crystal devices in reflection mode for modulating the three primary colours. A single light source illuminates a beamsplitter which splits the light spectrum into the three colours and directs the light to the liquid crystal displays. The reflected light then passes back through the prism to a projection system.

U.S. Pat. No. 5,321,789 discloses a reflective liquid crystal display of the projection type. In one embodiment, the liquid crystal display has a front fibre plate, presumably for reducing parallax errors. The angle of incidence of light from the light source is equal to and opposite the angle of reflection to the projection optics.

JP 0 928 1477 discloses a direct view reflective liquid crystal display. A front hologram performs colour filtering to direct red, green and blue light to the appropriate pixels. The display has a reflective rear hologram.

DISCLOSURE OF THE INVENTION

According to the invention, there is provided a projection display comprising a transmissive spatial light modulator and an illuminator for illuminating the modulator from the front thereof, characterised by a hologram disposed on the rear of the modulator for imaging and reflecting back through the modulator light from the illuminator received through the modulator.

The hologram may be arranged to form an image of part of the illuminator in front of the modulator.

The hologram may be arranged to perform the functions of a reflector and an off-axis lens with aberration correction.

The hologram may be a volume reflection hologram.

The hologram may include at least one continuous region for reflecting and imaging light of respective primary colours.

The at least three regions may be continuous layers.

The illuminator may include a light source and a first condensing optic for forming an image of the light source at a first location.

The hologram may be arranged to form an image of the light source at a second location which is spaced from the first location.

The second location may be laterally spaced from the first location.

The first and second locations may be laterally offset with respect to the modulator.

The display may include a projection optic for forming an image of the modulator on a screen.

The projection optic may have an entrance pupil disposed substantially at the second location.

The illuminator may include a field stop associated with the first condensing optic and a second condensing optic for imaging the field stop on the modulator.

The hologram may be pixellated to correspond with the pixellation of the spacial light modulator, and hence reflect light of the corresponding SLM pixel primary.

The display may include a turning optic for turning light from the illuminator towards the modulator.

The turning optic may include a half mirror.

The turning optic may include a reflecting surface.

The reflecting surface may be arranged to turn light from the modulator.

The first and second locations may be disposed substantially at respective adjacent surfaces of the prism.

The illuminator may include an homogeniser disposed between the light source and the first condensing optic.

The illuminator may include a polarisation conversion optic disposed between the homogeniser and the first condensing optic.

The light source may include at least one light emitter and collecting optic.

The or each collecting optic may include a mirror.

The light source may include respective primary colour emitters.

The modulator may include a liquid crystal device.

The device may include a rear substrate, a liquid crystal layer, and a rear polariser disposed between the rear substrate and the liquid crystal layer, the hologram being disposed between the liquid crystal layer and the rear substrate.

A glass layer may be disposed between the liquid crystal layer and the hologram.

The modulator may include a rear polariser.

The rear polariser may include first and second polarisers and the hologram may be disposed between the first and second polarisers.

The display may include a third polariser for supplying incident light with a first polarisation from the illuminator to the modulator and a fourth polariser for passing light reflected from the modulator with a second polarisation substantially orthogonal to the first polarisation.

The display may include a polarising beam splitter for reflecting incident light with a first polarisation from the illuminator to the modulator and for passing light reflected from the modulator with a second polarisation substantially orthogonal to the first polarisation.

The modulator may include a front polariser and waveplate.

The modulator may include a plurality of picture elements, each of which is switchable between a light transmissive mode and a light scattering mode.

The display may include a backlight for illuminating the modulator through the hologram to provide a direct viewing display mode.

It is thus possible to provide a projection display which makes use of a transmissive spatial light modulator such as an LCD and which reduces or overcomes disadvantages of known displays of this type. The hologram can be recorded in such a way that it performs an imaging function which is compensated at least partly for aberrations so as to provide improved display quality. For instance, first order correction for aberrations during recording can provide a substantially uniform reflection with uniform illumination across the whole image. Also, the hologram may be relatively thin so that parallax errors are substantially uniform across the image and illumination uniformity is maintained.

It is also possible to provide a projection system using a relatively large LCD panel with a compact illumination system. This has the advantage of allowing a relatively large pixel size at high resolutions, thus maximising the aperture ratio of the individual pixels. Hence it is possible to produce a compact, high efficiency projection system. Unwanted diffraction effects from very small pixels that are found in high resolution small panels are minimised. The holographic field element gives a flat image plane of the LCD so that the Modulation transfer function (MTF) of the projection system is maintained.

The projection lens in such a system is a low numerical aperture, wide field angle lens as opposed to a high numerical aperture low field angle lens. This allows the lens to be of small input aperture size, reducing stray light effects in the display and improving display contrast.

A compact folded projection system can be produced from such a large panel display. Conventional systems require bulky optics for large panels, but the use of this kind of reflection geometry reduces the system bulk substantially.

The hologram may be recorded under conditions to match the system etendue. The illuminator dimensions determine the system etendue, which is also proportional to the product of the modulator area and the solid angle of modulator illuminating light. A given modulator area therefore results in a predetermined illumination numerical aperture for optimum light throughput. This also determines the system aberrations and thus the working distance of the hologram. The abberations of the hologram may be tuned so that the image of the light source produced by the hologram is substantially uniform at each point on the hologram.

The hologram may have substantially no visible structure. Accordingly, there is no Moire beating with the structure of the modulator so that no undesirable visible fringes are produced.

By using a reflection volume hologram, the hologram only reconstructs at or near the conditions determined at manufacture of the hologram. Any other illumination structure is substantially unaffected. Accordingly, the display may be used in a direct view mode with a backlight and without modification to the modulator. In particular, it is not necessary to remove the hologram in order to provide the direct view mode.

BRIEF DESCRIPTION OF THE DRAWINGS

The invention will be further described, by way of example, with reference to the accompanying drawings, in which:

FIGS. 15 and 16 are diagrams illustrating problems which would occur if the hologram were replaced by a mirror and lens;

FIG. 17 is a diagram illustrating a first type of LCD which may be used as the modulator of any of the embodiments;

FIG. 18 is a diagram illustrating a first way of manufacturing the LCD of FIG. 17;

FIG. 19 is a diagram illustrating a second way of manufacturing the LCD of FIG. 17;

FIGS. 20a and 20b are diagrams illustrating a colour filter arrangement of the modulator of any of the embodiments;

FIG. 22 is a diagram illustrating a display of the type shown in FIG. 5 having a folded optical system;

FIG. 23 is a diagram illustrating a second type of LCD which may be used as the modulator in any of the embodiments;

FIG. 24 is a diagram illustrating in more detail a sixth alternative type of reflection section;

FIGS. 29a and 29b illustrate foldable displays constituting a fourth embodiment of the invention;

Like reference numerals refer to like parts throughout the drawings.

BEST MODE FOR CARRYING OUT THE INVENTION

Figure 1:
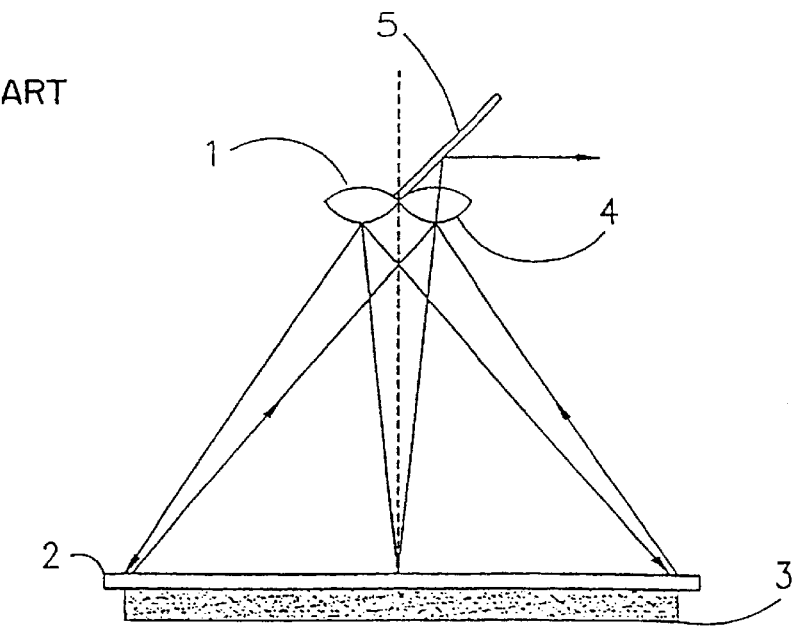
FIG. 1 is a diagram illustrating a known projection display.
Figure 2A:
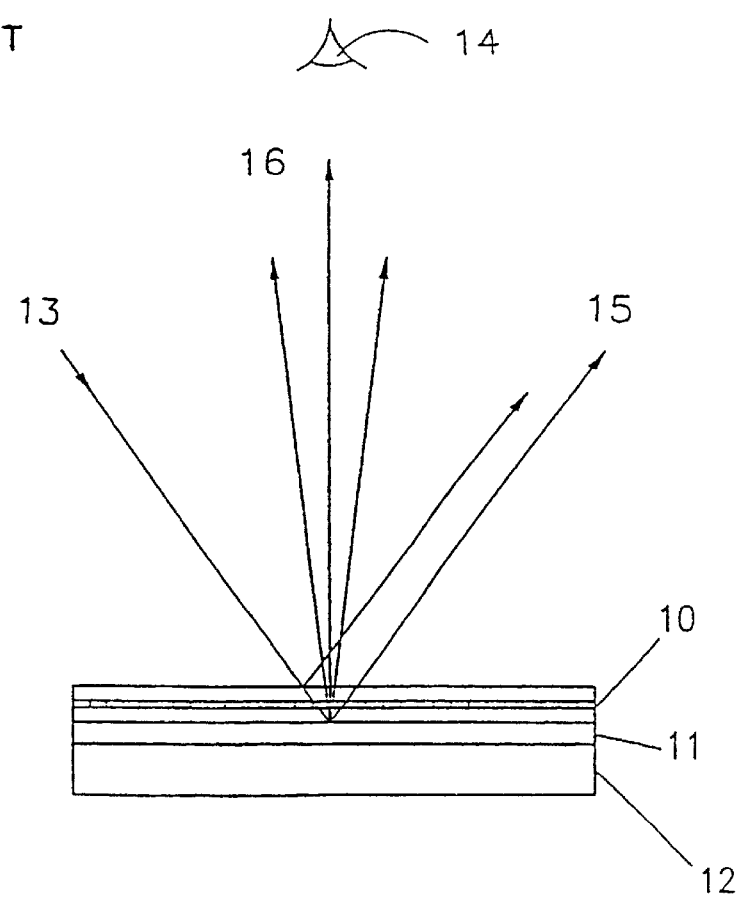
FIGS. 2a and 2b are diagrams illustrating a known display in backlit and reflection modes, respectively.
Figure 2B:
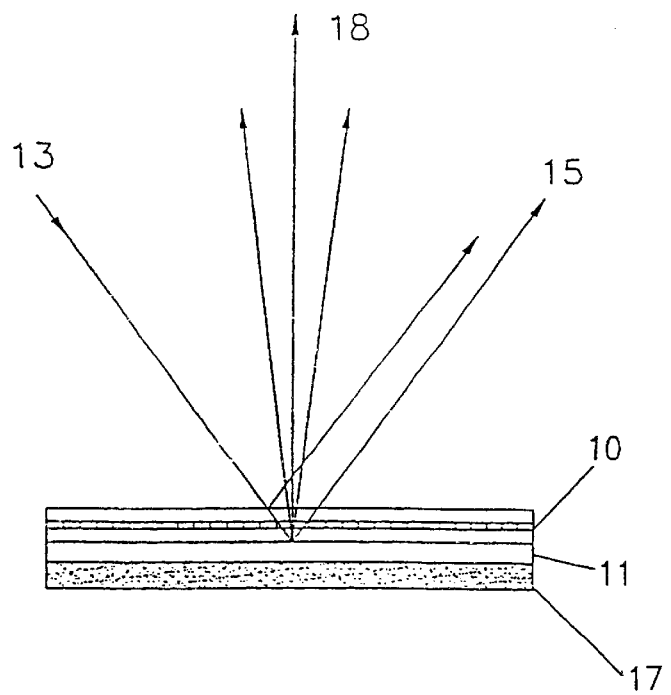
Figure 3:
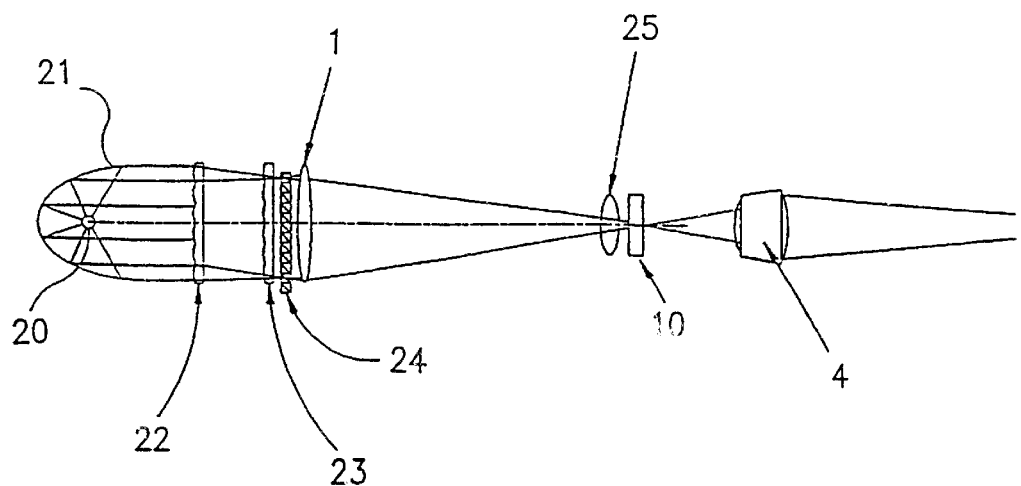
FIG. 3 is a diagram illustrating a known projection display.
Figure 5:
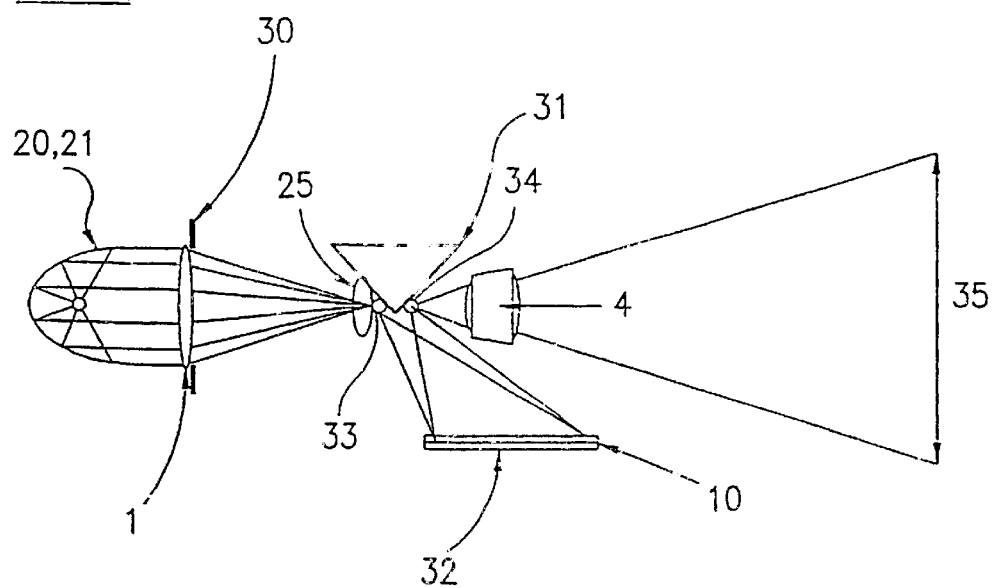
FIG. 5 is a diagram illustrating a projection display constituting a first embodiment of the invention.

FIG. 5 illustrates a projection display comprising an illuminator having a lamp and collecting optics 20, 21, a condensing optic 1 and a condensing optic 25 of the same type as illustrated in FIG. 3. A field stop 30 is associated with the condensing optic 1. The condensing optic 1 forms an image 33 of the light source formed by the lamp and collecting optics 20, 21 above but offset from a spatial light modulator in the form of a liquid crystal display 10. The image 33 is formed substantially at a first surface of a turning prism 31.

The turning prism 31 reflects light from the light source onto the LCD 10. The condensing optic 25 images the field stop 30 on the LCD 10 so as not to overfill the LCD with light.

A hologram 32 is disposed on the rear surface of the LCD 10. Light is directed through each pixel of the LCD 10 and is reflected back through the same pixel by the hologram 32. The light is reflected by each point on the hologram 32 to form a second reflected image 34 of the light source at the input pupil or aperture of a projection lens 4. The image 34 is formed substantially at a second surface of the turning prism 31 adjacent the first surface. The second surface reflects light from the LCD 10 to the projection lens 4 which forms a final image 35, for instance on a screen of a front-projection or back-projection system.

The hologram 32 is recorded in such a way that it functions as a combined mirror and off-axis lens with aberration correction. The hologram 32 has a flat structure and can be index-matched to the rear surface of the LCD 10 to reduce Fresnel reflection losses.

The images 33 and 34 are laterally displaced with respect to the LCD 10. Accordingly, no specular reflections, for instance from the front surface or the internal structure of the LCD 10, remain within the optical path of the display. The absence of such specular reflections from the optical path results in improved contrast ratio of the display.

The hologram has substantially no visible structure irrespective of how it is illuminated. Thus, there is no Moire beating with the structure, such as the pixel structure, of the LCD 10 and hence no fringes are visible in the final image 35.

Figure 6:
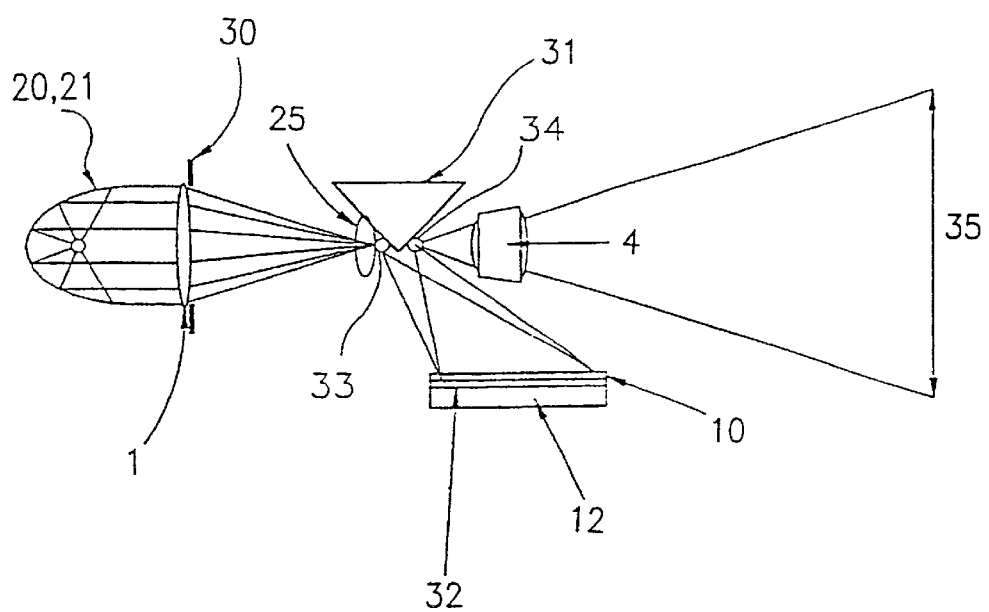
FIG. 6 is a diagram illustrating a dual mode display constituting a second embodiment of the invention.

FIG. 6 illustrates a display which differs from that shown in FIG. 5 in that it is of the dual-mode type. In particular, the display of FIG. 6 is provided with a backlight 12 below the hologram 32.

When operated in the projection display mode, the backlight 12 can be switched off and the display of FIG. 6 operates in the same way as the display of FIG. 5. When operated in the direct view mode, the lamp 20 is extinguished and the backlight 12 is illuminated. If necessary or desirable for improved viewing, the LCD 10 with the attached hologram 32 and the backlight 12 may be removed from the projection system. The backlight 12 illuminates the LCD 10 in the usual way to provide a conventional direct view display. The hologram 32 is recorded in such a way that it has no substantial effect when illuminated by the backlight 12, which functions as a substantially Lambertian light source. Accordingly, it is unnecessary to remove the hologram 32 for direct viewing. Similarly, the presence of the backlight 12 does not affect operation in the projection mode.

Figure 7:
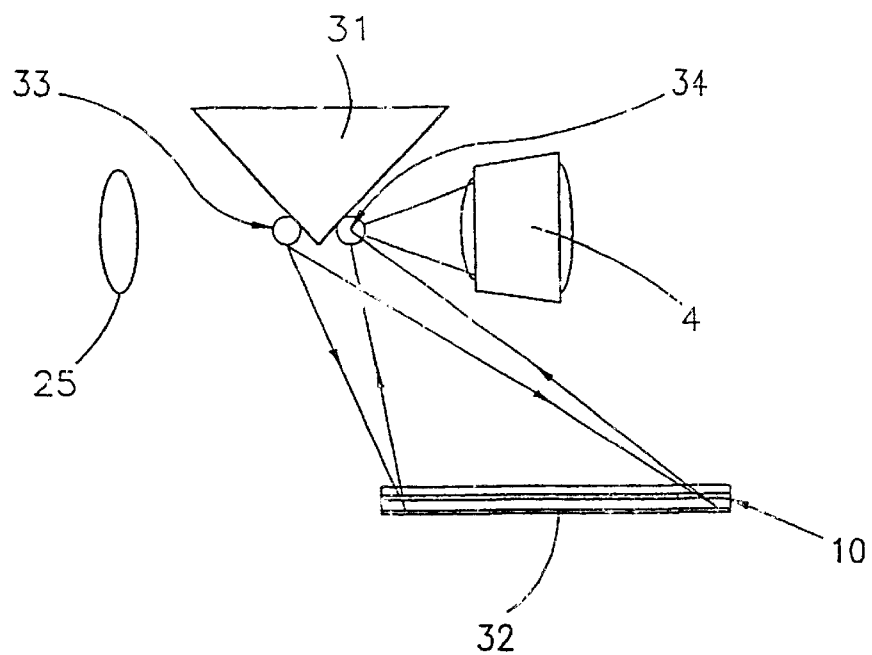
FIG. 7 is a diagram illustrating in more detail a reflection section of the displays of FIGS. 5 and 6.

FIG. 7 illustrates the reflection section of the display shown in FIG. 5 in more detail. As described hereinbefore, the condensing optic 1 forms the image 33 of the source substantially at the turning prism 31. The prism 31 reflects the light towards the LCD 10 and the condensing optic 25 forms an image of the field stop 30 at the LCD 10. The hologram 32, which has a thickness of the order of 5 to 30 micrometers, performs a reflection and off-axis lens imaging function so that light passing through each pixel of the LCD 10 is reflected back through the same pixel and a reflected image 34 of the source is formed at the second surface of the prism 31 and at the entrance pupil of the projection lens 4.

The images 33 and 34 are laterally displaced from each other and are laterally displaced with respect to the LCD 10, i.e. the locations of the images 33 and 34 are not vertically above the LCD 10. In order to prevent light leakage, the prism 31 must prevent any light from the light source from passing directly to the projection lens 4 (i.e. without being turned by the prism 31, reflected from the hologram 32 and turned again by the prism 31). However, in order to maximise light throughput, the spacing between the images 33 and 34 should be minimised.

Figure 8:
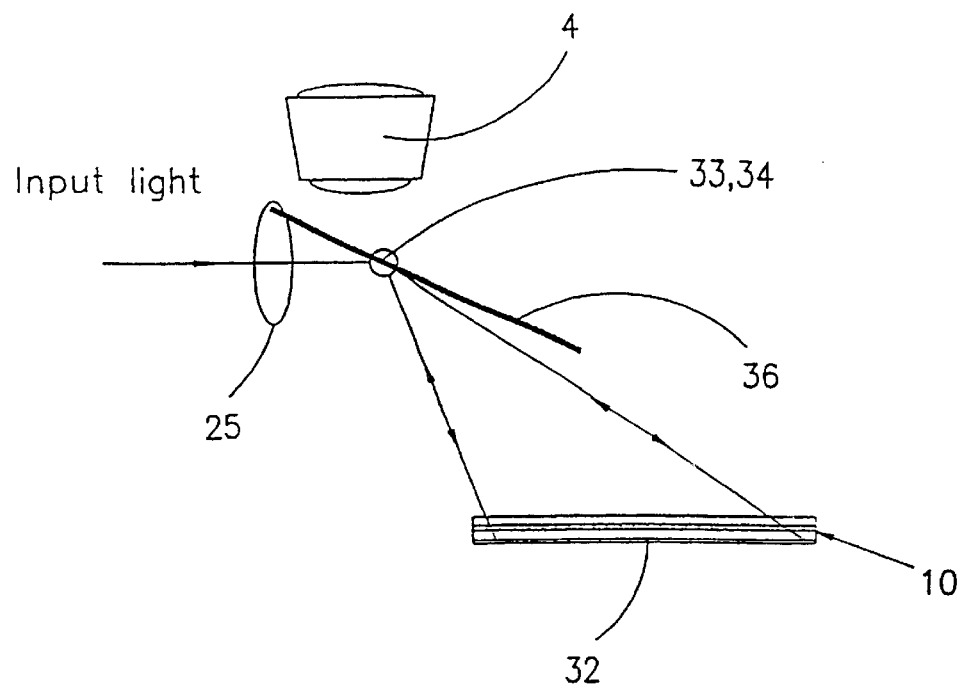
FIG. 8 is a diagram illustrating in more detail a first alternative type of reflection section.

FIG. 8 illustrates an alternative type of reflection section which may be used in the displays shown in FIGS. 5 and 6. This section differs from that shown in FIG. 7 in that the turning prism 31 is replaced by a half mirror 36 and the hologram 32 is arranged to form the reflected image 34 at the same place as the image 33 formed by the condensing optic 1. The half mirror 36 reflects the light from the light source onto the LCD 10 and the reflected light from the hologram 32 through the LCD 10 is transmitted through the half mirror 36 to the projection lens 4.

The incident and reflected light paths coincide so that there is minimal loss of light by parallax because of the finite spacing of the hologram 32 from the liquid crystal layer of the LCD 10. However, substantial light loss occurs at the half mirror 36. Accordingly, a display using the reflection section shown in FIG. 8 would generally have reduced brightness compared with a display using the reflection section shown in FIG. 7.

Figure 9:
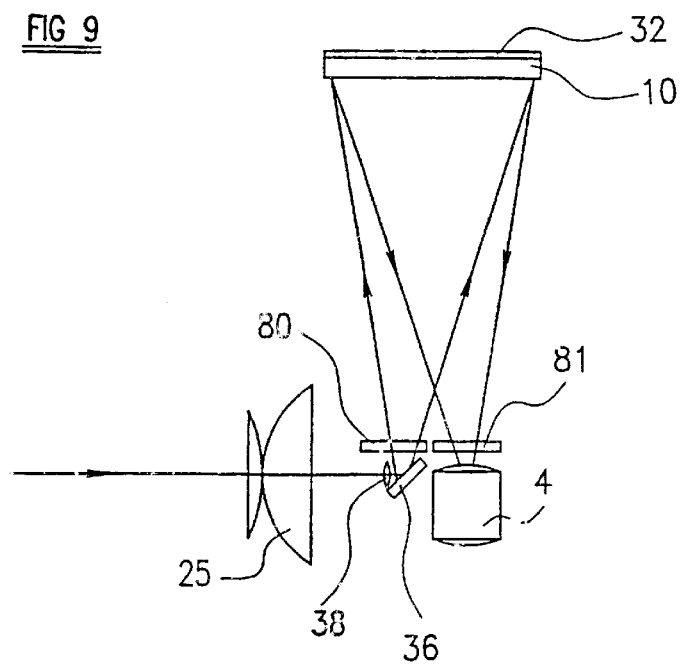
FIG. 9 is a diagram illustrating in more detail a second alternative type of reflection section.

The reflection section shown in FIG. 9 differs from that shown in FIG. 8 in that a further condensing optic 38 is provided. Also, the LCD 10 does not include any polarisers. Instead, polarisers 80 and 81 are provided such that the incident light from the condensing optics 25 and 38 is reflected by the mirror 36 through the polariser so as to be incident on the LCD 10. The reflected light from the LCD 10 and the hologram 32 passes through the polariser 81 to the projection lens 4. The polarisers 80 and 81 are linear polarisers—their polarisation directions may be perpendicular to each other.

Figure 10:
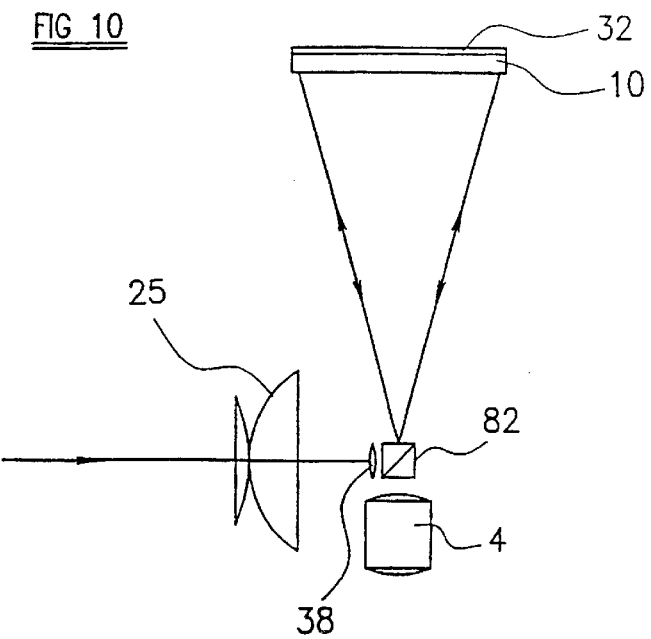
FIG. 10 is a diagram illustrating in more detail a third alternative type of reflection section.

The reflection section shown in FIG. 10 differs from that shown in FIG. 9 in that the mirror 36 and the polarisers 80 and 81 are replaced by a polarising beam splitter 82. Also, the images of the source coincide at the internal reflecting surface of the polarising beam splitter 82.

The absence of polarisers in the LCD 10 of FIG. 9 and FIG. 10 mean that the LCD 10 can operate only in the reflection mode. The polariser 80 in FIG. 9 or the polarising beam splitter 82 in FIG. 10 direct the correct light input polarisation to the LCD 10 whereas the orthogonal polariser 81 or the polarising beam splitter 82 analyses the output polarisation of the LCD 10.

In the reflection section shown in FIG. 10, the input and output spots need not be laterally displaced. The hologram 32 thus has less work to do and any parallax losses may be reduced even further.

Reflection LCDs cooperating with crossed polarisers as shown in FIGS. 9 and 10 are capable of higher contrast performance than are LCDs having a single input polariser, for example as would be used in the reflection section shown in FIG. 8. Additional quarter waveplates may be added to reduce still further the effects of unwanted specular reflections.

It may be possible to operate displays of the type shown in FIGS. 9 and 10 "on-axis" so as to reduce the requirements of the polarising beam splitter 82, the LCD 10 and the projection lens 4. Specular reflections generated within the system have a similar polarisation to the input polarisation whereas the light which is used for display is in the orthogonal output polarisation. Thus, output light arriving at the projection lens 4 comes only from switched pixels of the LCD 10 whereas light resulting from specular reflections is greatly attenuated by the polariser 81 or by the polarising beam splitter 82. Thus, the image performance of the display may be enhanced. Further, the projection lens 4 is required to operate at a lower field angle.

The range of angles at which light is incident on the polarising beam splitter 82 may be such that there is a variation in performance across the display surface. The beam splitter 82 may therefore need to be of the wide angle performance type.

Figure 11:
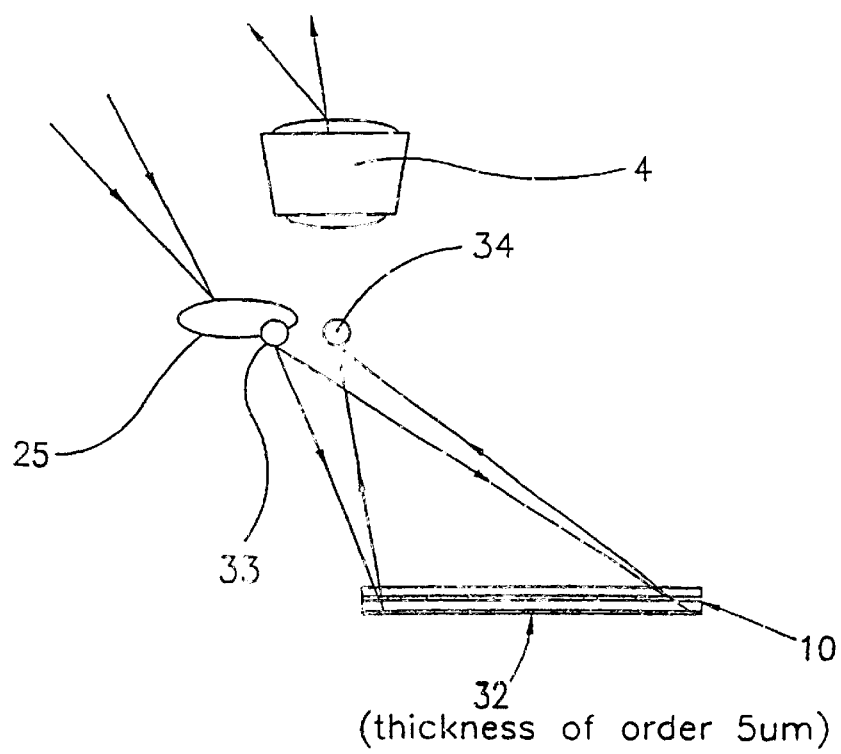
FIG. 11 is a diagram illustrating in more detail a fourth alternative type of reflection section.

The reflection section shown in FIG. 11 differs from those shown in FIGS. 7 and 8 in that there are no turning optics so that light from the light source is directed without reflection onto the LCD 10 and reflected light passes to the projection lens 4 without reflection. Although such an arrangement avoids the use of turning optics, the minimum separation between the images 33 and 34 is greater than for the section shown in FIG. 7 in order to provide adequate physical separation between the elements of the display. The increased separation of the images 33 and 34 results in greater parallax losses and hence in reduced image brightness and increased image crosstalk.

Figure 12:
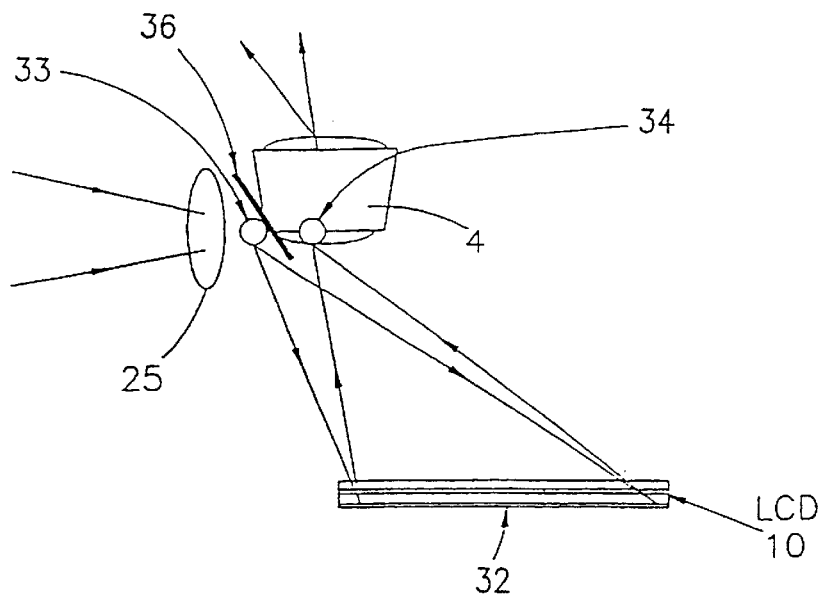
FIG. 12 is a diagram illustrating in more detail a fifth alternative type of reflection section.

FIG. 12 illustrates a reflection section which is similar to that shown in FIG. 8 but in which a fully silvered mirror 36 reflects light from the light source onto the LCD 10 and the images 33 and 34 are laterally spaced so that reflected light passes directly to the projection lens 4 without reflection. The minimum spacing between the images 33 and 34 may be reduced compared with that in FIG. 11 but is still greater than that in FIG. 7.

Figure 13:
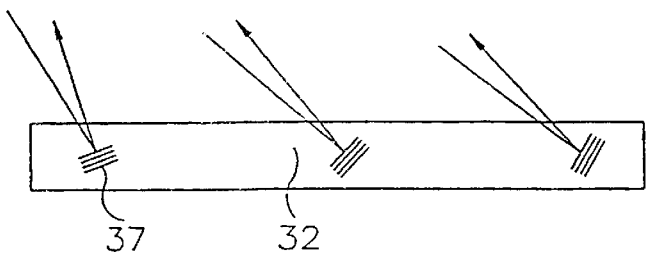
FIG. 13 is a schematic diagram illustrating fine structure of a hologram of the displays of FIGS. 5 and 6.

FIG. 13 illustrates diagrammatically the structure of the hologram 32, which may be of the volume reflection type. The alignment of fringes such as 37 is illustrated at three positions across the hologram 32 so as to illustrate the alignment which is recorded during manufacture to redirect light back to the entrance pupil of the projection lens 4.

The hologram has the properties of a flat off-axis reflective field lens for imaging the image 33 of the light source to the second displaced image 34 at the pupil position. The hologram also has the properties of first order correction for aberration so that uniform reflection is obtained for each part of the pupil and each part of the LCD 10. The hologram is relatively thin, for instance of the order of 5 to 100 micrometers, so that parallax errors are uniform across the LCD 10 and illumination uniformity due to parallax losses is maintained.

The hologram may be recorded and processed under conditions to match the system etendue. The aberrations of the holograms are tuned so that the reflected image of the light source is uniform for each point on the hologram.

The hologram has substantially no visible structure and so cannot beat with the structure of the LCD 10 to produce unwanted Moiré fringes across the LCD. Also, the hologram is a reflection volume hologram and can reconstruct only under the specific conditions when manufactured. Any other illumination structure is substantially unaffected so that the hologram is not visible when the backlight 12 is illuminated and the display shown in FIG. 6 is operated in the direct view mode.

Figure 14:
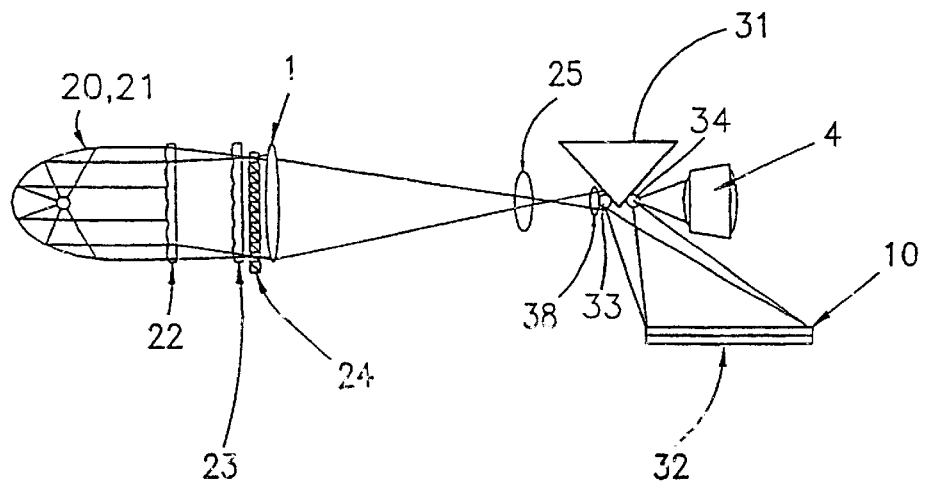
FIG. 14 is a diagram illustrating a projection display constituting a third embodiment of the invention.

The display shown in FIG. 14 differs from that shown in FIG. 5 in that the illuminator comprises the homogeniser lens arrays 22 and 23 and the polarisation beam splitter cubes with half wave-plate 24 as illustrated in FIG. 3. Such an arrangement provides improvements in uniformity of illumination of the LCD 10 and improved efficiency of utilisation of light by converting more of the light from the lamp 20 to a polarisation which is aligned with the transmission direction of an input polariser of the LCD 10.

The display of FIG. 14 includes a further condensing optic 38 of the same type as shown in FIGS. 9 and 10. The collecting optic 21 effectively illuminates the first homogeniser lens array 22. The first homogeniser lens array 22 produces an image of the light source 20 at each of the lenses of the second homogeniser lens array 23. The second lens array 23, in conjunction with the condensing optic 1, generates overlapping images of the rectangular lens apertures of the array 22 at the plane of the condensing optic 25.

For example, a 1.5 mm metal halide arc lamp has an etendue of 50 mm 2 sr to provide 90% of lamp power. In conventional compact projection systems, a small panel such as 1" diagonal is used. This requires a maximum stop setting of approximately f#2.0 lens (assuming polarisation recirculation optics are used which double the etendue of the system). Such a lens is also required to have high resolution and magnification. In this system, a 5" panel is required to be illuminated at f#10 to have the same optical throughput. For example, this may be a 10 mm aperture at 100 mm from the source. In this case, the imaging is Kohler type rather than telecentric type; the lens input aperture is smaller than the panel size. Thus the projection lens is a low aperture wide angle Kohler lens rather than a high aperture low angle telecentric lens.

The use of a small aperture lens means that the projection lens is relatively immune to collection of stray light in the system compared to conventional small panel projection lenses. Thus the contrast of the system is enhanced.

The second condensing optic 25 produces a demagnified image 33 of the first condensing optic 1 at the first turning mirror formed by a surface of the turning prism 31. The third condensing optic 38 produces an image of the second condensing optic 25 at the LCD 10 to provide uniform illumination of the same shape as the LCD 10.

Operation of the remainder of the display of FIG. 14 is as described hereinbefore with reference to FIG. 5.

By way of comparison, FIGS. 15 and 16 illustrate the problems which would occur if the hologram 32 were replaced by a conventional off-axis lens 39 and a mirror 40. The lens 39 would have to be substantially thicker than the hologram 32 so that the separation between the reflecting surface of the mirror 40 and the LCD 10 would be substantially increased. This results in a substantial increase in parallax errors. The significant sag of the lens 39 would cause a variation in the parallax errors across the surface of the LCD 10. Further, the presence of glass-air surfaces increases reflection losses in the system.

Because the lens 39 is operating significantly off-axis, there would be substantial off-axis aberration. This would result in variations in the image 34 of the source for different points across the LCD 10. This would result in variations of efficiency leading to degraded parallax errors and reduced uniformity of illumination. Further, for operation in the direct view mode, the mirror 40 would have to be removed.

FIG. 16 illustrates the off-axis operation and the formation of a virtual image 41 of the source before reflection in the mirror 40.

The displays illustrated in FIGS. 5 to 12 and 14 have the hologram 32 disposed on the rear surface of the LCD 10. The hologram 32 is therefore spaced from the liquid crystal layer of the LCD 10 by the intervening structure, of which the thickest element is the lower or rear substrate. This results in some parallax errors due to the effective separation of the liquid crystal layer for input and output optical paths with respect to the hologram.

FIG. 17 illustrates a structure of the LCD 10 in which the hologram 32 is provided internally of the device. The LCD 10 comprises an upper substrate 42 carrying on its outer surface an external polariser 43. A lower or rear substrate 44 has formed on its inner surface the hologram 32, above which is provided an internal or rear polariser 45. The substrate arrangements are separated by a gap which contains a liquid crystal layer 46. Other parts of the structure such as alignment layers and electrode arrangements are not shown for the sake of clarity. A single polariser mode of operation as described hereinafter removes the need for an internal polariser.

By providing the hologram 32 internally of the LCD 10, the spacing between the liquid crystal layer 46 and the hologram 32 is greatly reduced. Thus, this arrangement provides substantially reduced parallax errors.

FIG. 18 illustrates in more detail the construction of the layers carried by the substrate 44. Thus, the hologram 32 is deposited on the substrate 44 as a layer and is capable of withstanding a temperature of less than approximately 160° C. The hologram 32 is coated with an adhesive 47 capable of withstanding temperatures between approximately 150° and 180° C. The internal polariser 45 is formed on the adhesive 47 and is capable of withstanding a similar process temperature. Another adhesive layer 48 is formed on the polariser 45 and is capable of withstanding a similar process temperature.

For a dual mode device, colour filters are required in order to provide a colour image in direct view mode. The colour filters tend to reduce projected display brightness due to residual absorption of the required colour and so are undesirable if a bright projection system is required. Thus, for a single mode device, the colour filters may be omitted.

The remaining layers are formed in the conventional way for liquid crystal devices. Thus, a black mask 49 is formed, for instance by cold deposition, on the adhesive 48. Colour filters 50 are formed on the black mask 49 and are capable of withstanding a temperature of less than approximately 200° C. Indium tin oxide (ITO) electrodes 51 are formed on the colour filters 50 and are capable of withstanding a process temperature of less than approximately 150° to 200° C. Finally, an alignment layer 52 is formed on the ITO electrodes 51 at a process temperature of approximately 160° C.

In order for the arrangement shown in FIG. 17 to be manufacturable, the polariser 45 and the hologram 32 must survive the subsequent processing temperatures.

In order to function correctly, the liquid crystal layer 46 of the LCD 10 must not suffer contamination from adjacent layers which would affect its performance. In the event that such contamination might occur because of the internal disposition of the polariser 45 and the hologram 32, the arrangement shown in FIG. 19 may be used. This differs from the arrangement shown in FIG. 18 in that the black mask 49 is separated from the adhesive 48 by a thin glass layer 53.

The substrate of a typical LCD, for instance as shown in FIG. 18, is of the order of 0.5 to 1.1 mm thick. As shown in FIG. 19, it is possible to provide a thin glass layer 53 on which to form the black mask 49, the electrodes 51 and the alignment layer 52. In this case, the glass layer 53 may have a thickness of less than 0.2 mm. For example, 0.05 mm glass is commonly used for large area plasma address liquid crystal displays. The thickness of the substrate 44 is reduced as appropriate so as to maintain a structure thickness of 1.1 mm, for example.

Figure 20B:
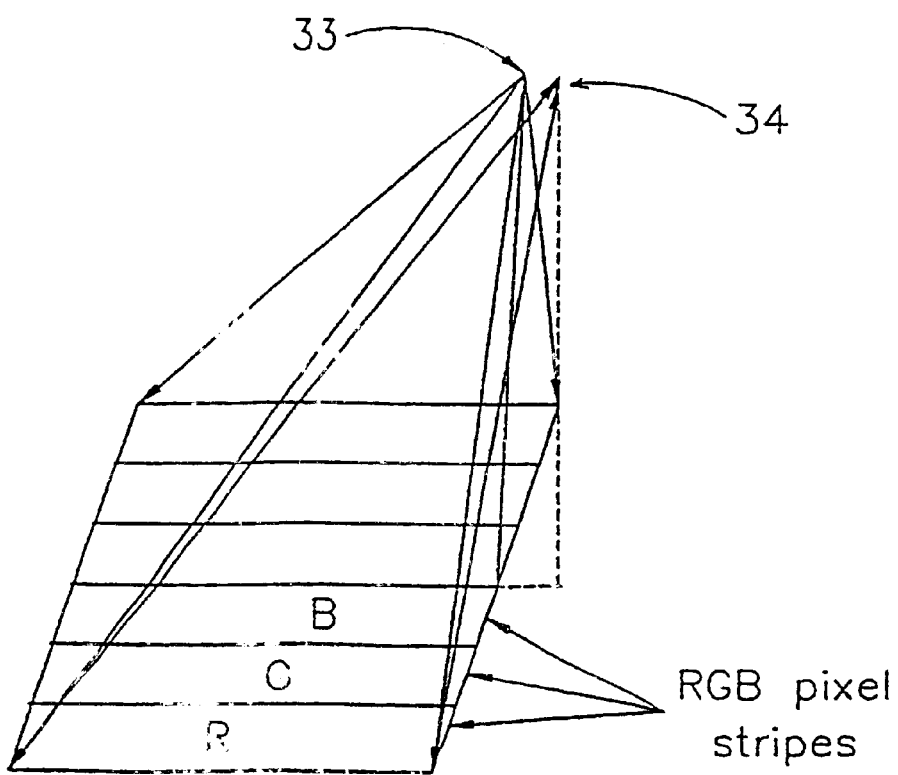

In the case where the LCD 10 comprises red (R), green (G) and blue (B) pixels of elongated shape, it is preferable for the orientation of the elongated pixels to be parallel to the offset between the images 33 and 34. Such an arrangement is illustrated in FIGS. 20a and 20b and minimises loss in brightness caused by parallax errors.

Figure 21A:
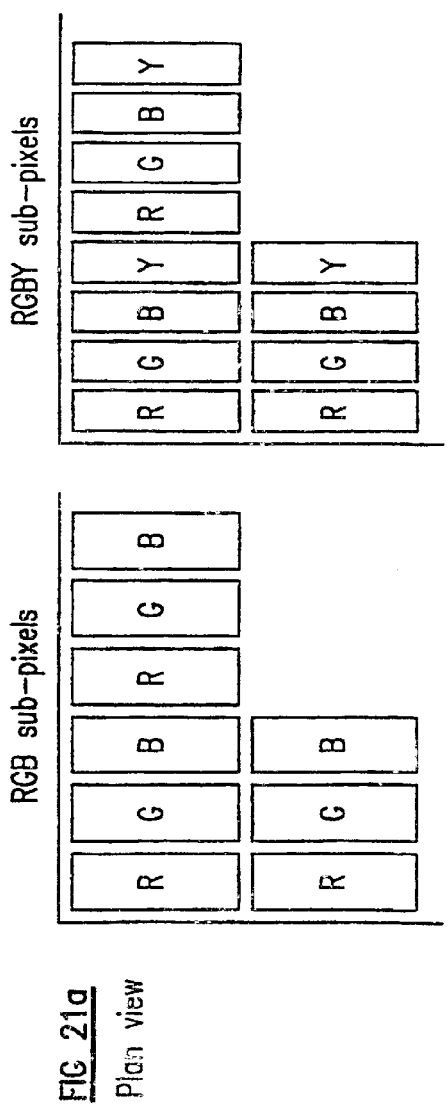
FIGS. 21a, 21b, 21c, and 21d are diagrams illustrating the use of RGB and RGBY sub-pixel sets.
Figure 21B:
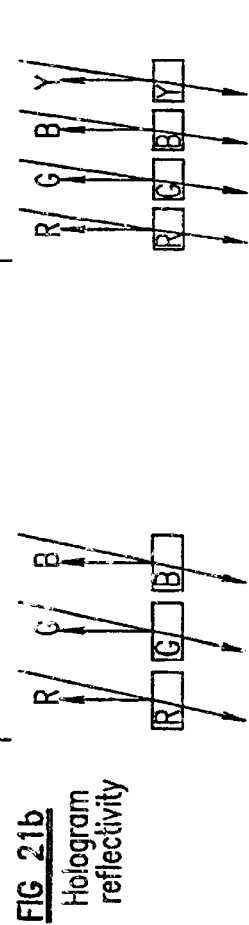
Figure 21D:
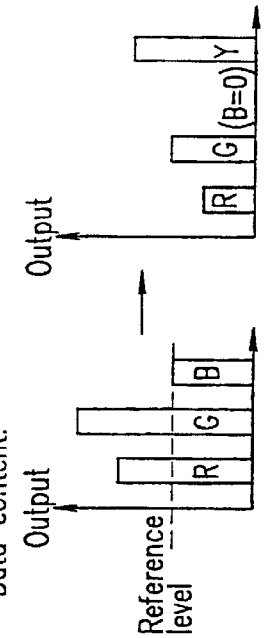
Figure 21C:
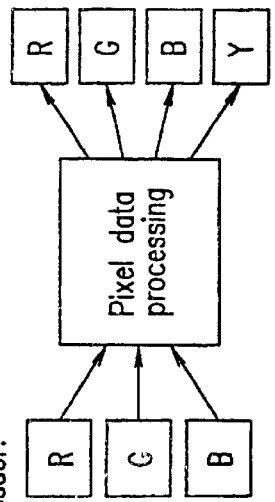

In addition to a three sub-pixel (RGB) set comprising each colour pixel, a four sub-pixel (RGBY) set can be used in which the Y (luminance) pixel represents a luminance value as shown in FIGS. 21a, 21b, 21c, and 21d. In this way, the overall display brightness can be improved, at the sacrifice of colour gamut. It is well known that such a technique can be employed but, in embodiments of this invention, the Y pixel can be implemented by using a white, or partially R+G+B reflector. It is often desirable that the Y pixel does not have fully reflectivity as that would degrade the colour gamut too greatly, so a partial reflectivity, such as 40% is desirable. The overall reflectivity of the element is controlled by modifying the pixel associated with the reflector by means of a pixel processor as shown in FIG. 21c. The resultant effect is a brightness gain as shown in FIG. 21d. Luminance pixel reflects a proportion of the light falling on it, representing a proportion of R+G+B data input. A small gain is input on to the Y channel in order to increase display brightness. Such a pixel can be made by patterning of the colour holograms such that, in the Y pixel, a percentage of R, G and B reflectors are recorded overlapping. For example, projection brightness improvements of up to approximately 40% may be achieved using this technique.

FIG. 22 illustrates the use of a display of the type shown in FIG. 5 with a folded optical system. Light from the projection lens 4 is directed onto a first turning mirror 54, which reflects light to a second turning mirror 55. Light reflected by the mirror 55 is imaged by the projection lens 4 on a projection screen 56. It is therefore possible to provide a more compact projection display arrangement compared with the unfolded arrangement illustrated in broken lines in FIG. 22.

Although FIG. 6 shows a dual mode display, any of the other embodiments illustrated in the drawings may be of the dual mode type and merely requires the positioning of a backlight in the manner illustrated in FIG. 6. A disadvantage of such dual mode systems is that the brightness varies between the direct view mode and the projection mode. In particular, in the projection mode, light passes twice through light-absorbing structures within the LCD 10, such as the colour filters 50 and the polarisers 43 and 45. However, in the direct view mode, light passes only once through such elements of the LCD 10.

FIG. 23 illustrates a technique for reducing such absorption of light by the polarisers. The "output" polariser 43 is of the HN35 type from Polaroid Corporation, i.e. the polariser 43 is of 35% efficiency. The "input" polariser 45 is replaced by two polarisers 57 and 58, each of the HN42 type having 42% efficiency. The hologram 32 is disposed between the polarisers 57 and 58.

In the direct view mode, light from the backlight 12 passes through the polariser 57, the hologram 32, the polariser 58 and the polariser 43. The transmission performance of the display is substantially unaffected compared with conventional arrangements and achieves a maximum transmission of 25%.

In the projection mode, light from the light source passes through the polariser 43 and the polariser 58 before being reflected by the hologram 32. The reflected light then passes through the polariser 58 and the polariser 43 so that no light passes through the polariser 57. In this mode, the reflection performance of the LCD is optimised and a maximum transmission of 17% can be achieved.

As in the case of the rear polariser 45, light passes twice through the colour filters 50 in the projection mode. Absorbing colour filters used in conventional LCDs, for instance of the thin film transistor type, have significant absorption so that the final intensity of light after a dual pass is substantially reduced. In order to reduce such light loss, particularly for embodiments of the projection-only type where the display is not intended for use in the direct view mode, the colour gamut of the colour filters 50 may be reduced so that the double pass of light suffers substantially the same absorption properties as a single pass through a standard colour filter. This may be achieved, for example, by halving the density or layer thickness of the colour filters 50 in the LCD 10. Thus, the brightness of the display may be improved without affecting the colour gamut.

In a further embodiment in which there is no reversionary mode of use of the display, the two polariser display may be replaced by a single polariser display as shown in FIG. 24. In this case, the display includes an input polariser and waveplate 83. The liquid crystal layer has suitable twist and birefringence such that the output polarisation can be adjusted between a black and white state. The hologram 32 does not substantially degrade the polarisation of the incident light falling on it so that useful display contrast may be obtained.

For higher display contrast, crossed polarisation modes of operation may be used as described hereinbefore.

Figure 25:
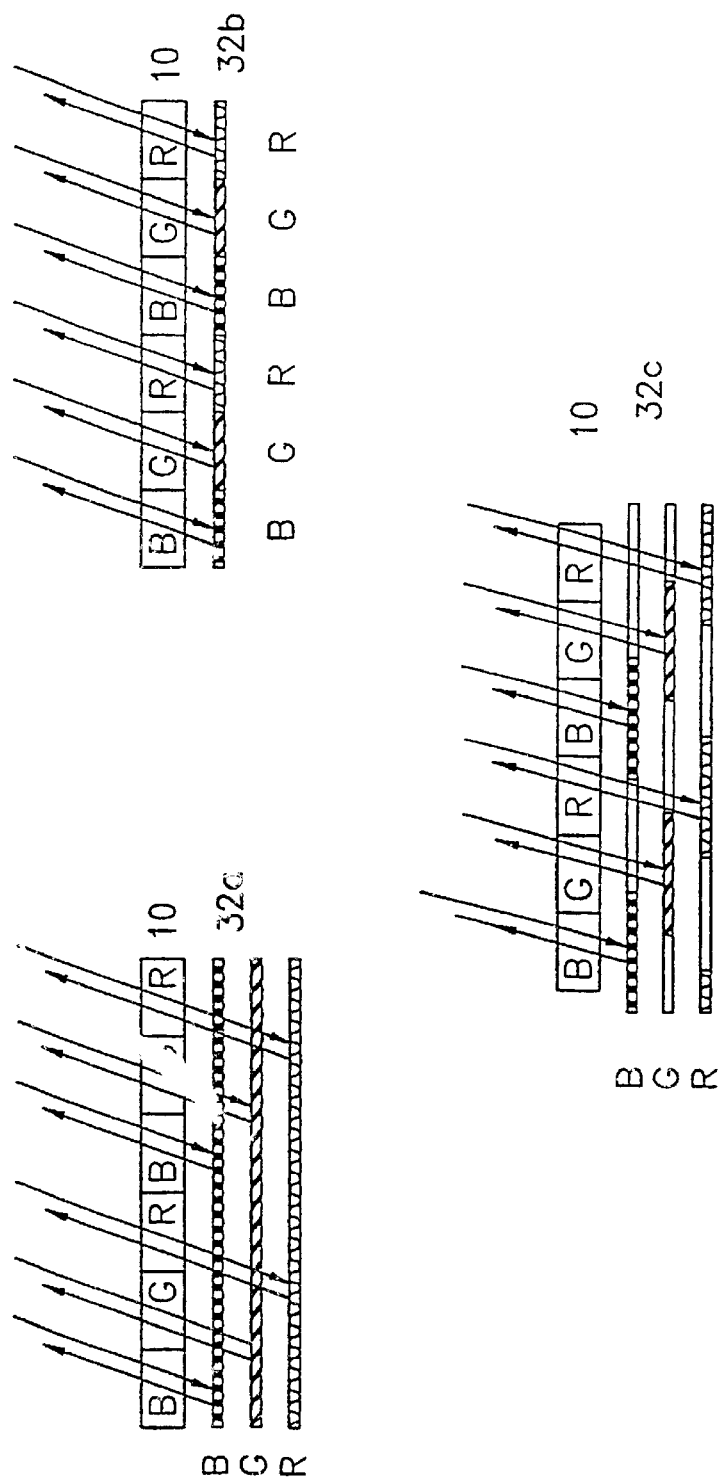
FIG. 25 is a diagram illustrating three types of holograms which may be used in any of the embodiments.

FIG. 25 illustrates three different types of hologram for use in any of the embodiments. The holographic reflector 32a comprises three layers which are continuous or unpixellated. Each layer reflects light within a spectral band centred on a respective primary colour of the respective colour filter of the SLM 10 and transmits light outside that band. Thus, the blue layer B reflects blue light back through the blue pixels of the SLM 10 and transmits green and red light. The green layer G reflects green light back through the green pixels and transmits red light, which is reflected by the red layer R back through the red pixels of the SLM 10. Such an arrangement does not require any precise registration between the holographic reflector 32a and the SLM 10.

The holographic reflector 32b is pixellated to correspond with the pixellation of the SLM 10. The hologram is in the form of a single layer with red R, green G and Blue B reflecting regions aligned with the red, green and blue pixels, respectively, of the SLM 10 which may or may not have associated absorbing colour filters. The holographic reflector 32b must therefore be manufactured to a sufficient tolerance to match the pixellation of the SLM 10 and must be registered with the SLM 10 during assembly of the display. Such an arrangement removes the need to include additional colour filters for a projection-only device. Because the hologram is a colour discriminatory device, it performs the function of colour filters which may be eliminated, improving projector brightness. The hologram may be in the form in one or more layers.

The holographic reflector 32c comprises a pixellated three layer arrangement with partially overlapping colour mirrors. Thus, manufacturing and registration tolerances can be relaxed compared with the arrangement using the holographic reflector 32b.

Figure 26:
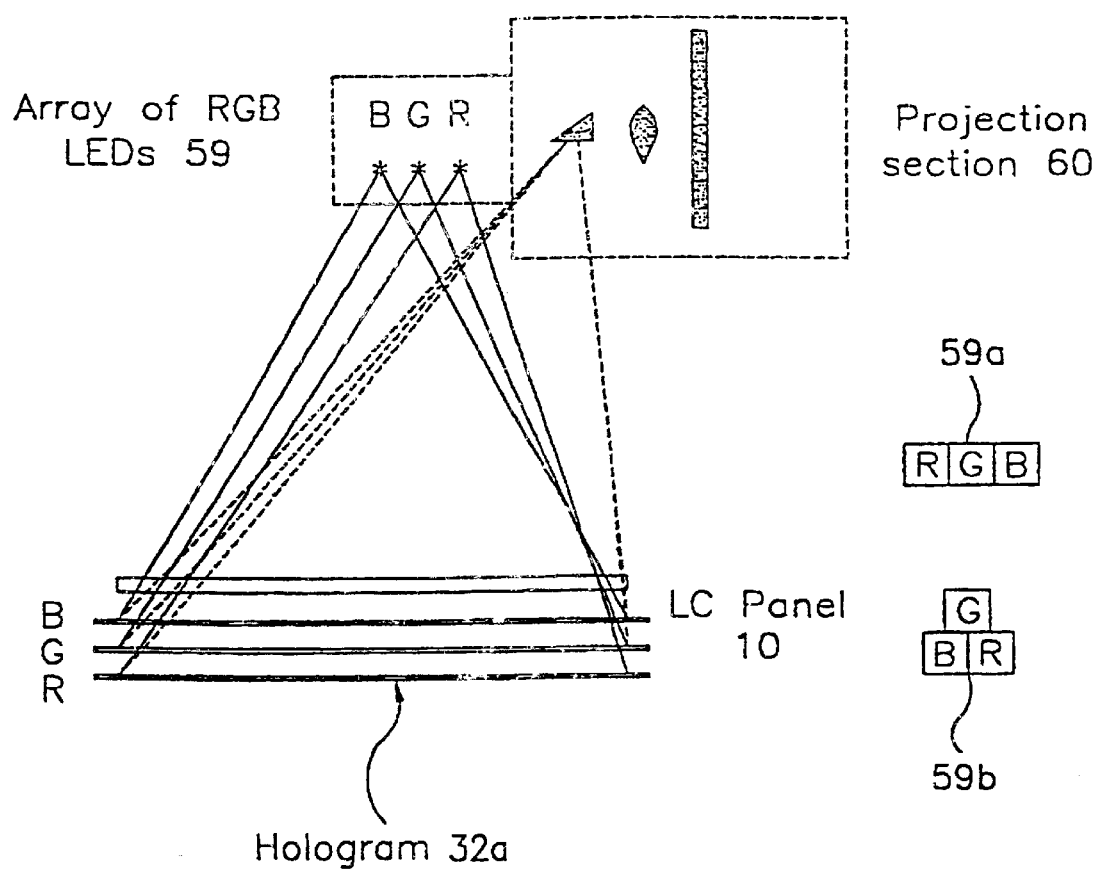
FIG. 26 is a diagram illustrating the use of a distributed colour light source in any of the embodiments.

FIG. 26 illustrates the use of a multicolour illuminator having an array of red, green and blue light emitting diodes (LEDs) shown diagrammatically at 59. Examples of the lateral positions of the red, green and blue LEDs are shown at 59a and 59b. The hologram additionally performs the function of a colour combiner by matching the directions of the reflected beams of the three colours into the projection section 60 of the display.

Figure 27:
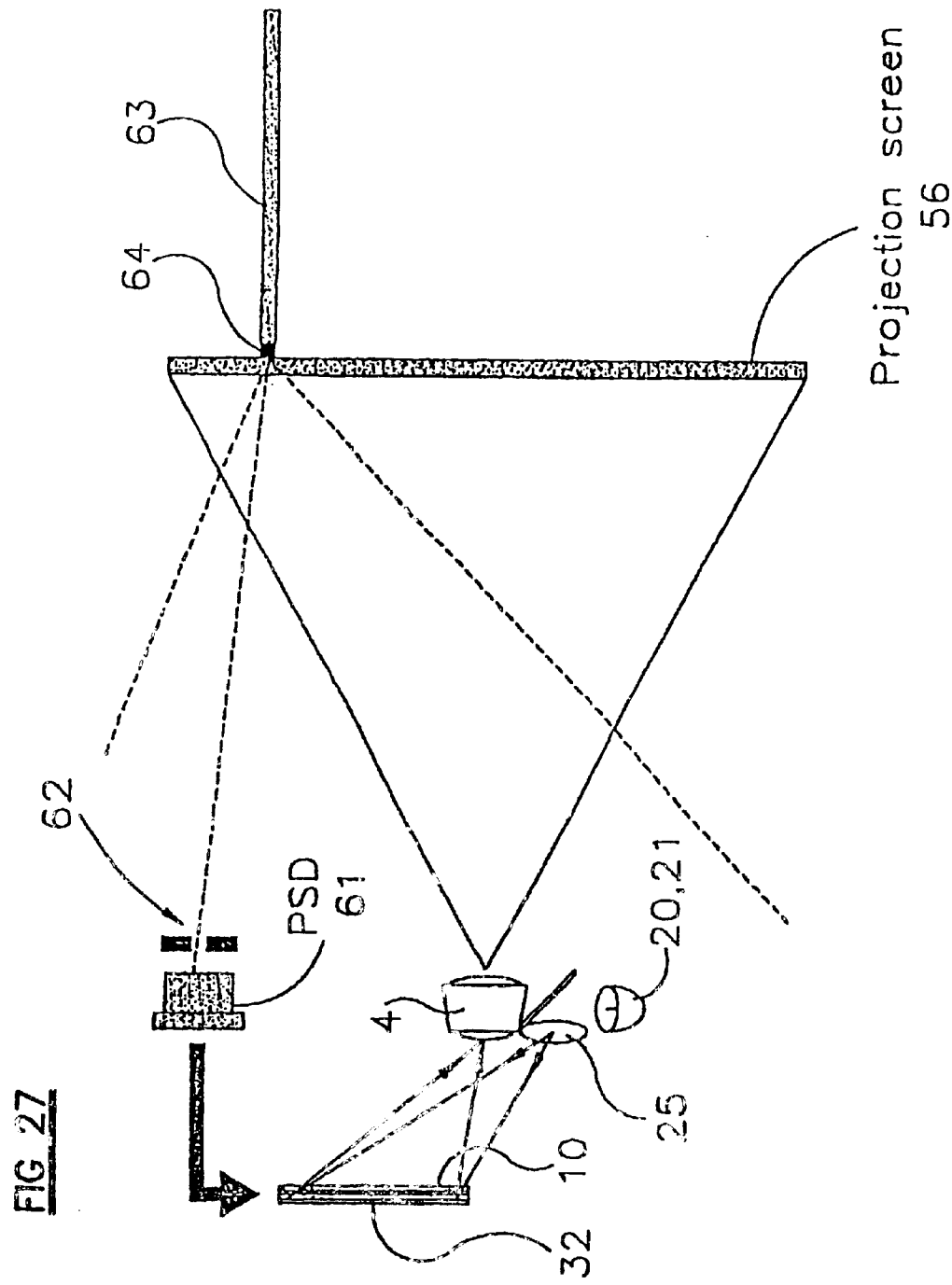
FIG. 27 is a diagram illustrating a display of the type shown in FIG. 5 arranged to provide a function similar to a touch screen.

Although it is known to form the LCD 10 as part of a touch screen to allow an observer to interact with a device such as a computer associated with the LCD 10, such an arrangement cannot readily be used in the projection mode. FIG. 27 illustrates an alternative arrangement which allows a similar type of interaction in the projection mode. The display includes a position sensitive detector (PSD) 61 disposed behind an aperture, for instance in the form of a slit 62. The PSD 61 is of known type and provides an output signal indicative of the position of the centre of illumination on its light sensitive surfaces. The output of the PSD 61 is connected to the display so as to allow the position information to be used by associated devices such as a computer.

A pointer 63 is provided for cooperating with the projection screen 56. The pointer 63 has a light emitting diode (LED) 64 at one end thereof for touching the screen 56 at a position selected by the observer. For instance, the position may correspond to the desired position of a curser displayed by the display. The LED may be of the infrared emitting type, to which the PSD 61 is sensitive.

In use, the observer positions the LED 64 of the pointer 63 at a desired position on the projection screen 56 in relation to the displayed image. The slit 62 acts as an imaging optic and transmits infrared radiation from the LED 64 to a position on the PSD 61 which is indicative of the position of the LED 64 on the screen 56. The position information from the PSD 61 may then be processed and used to control processing and/or the image displayed by the display.

Figure 28:
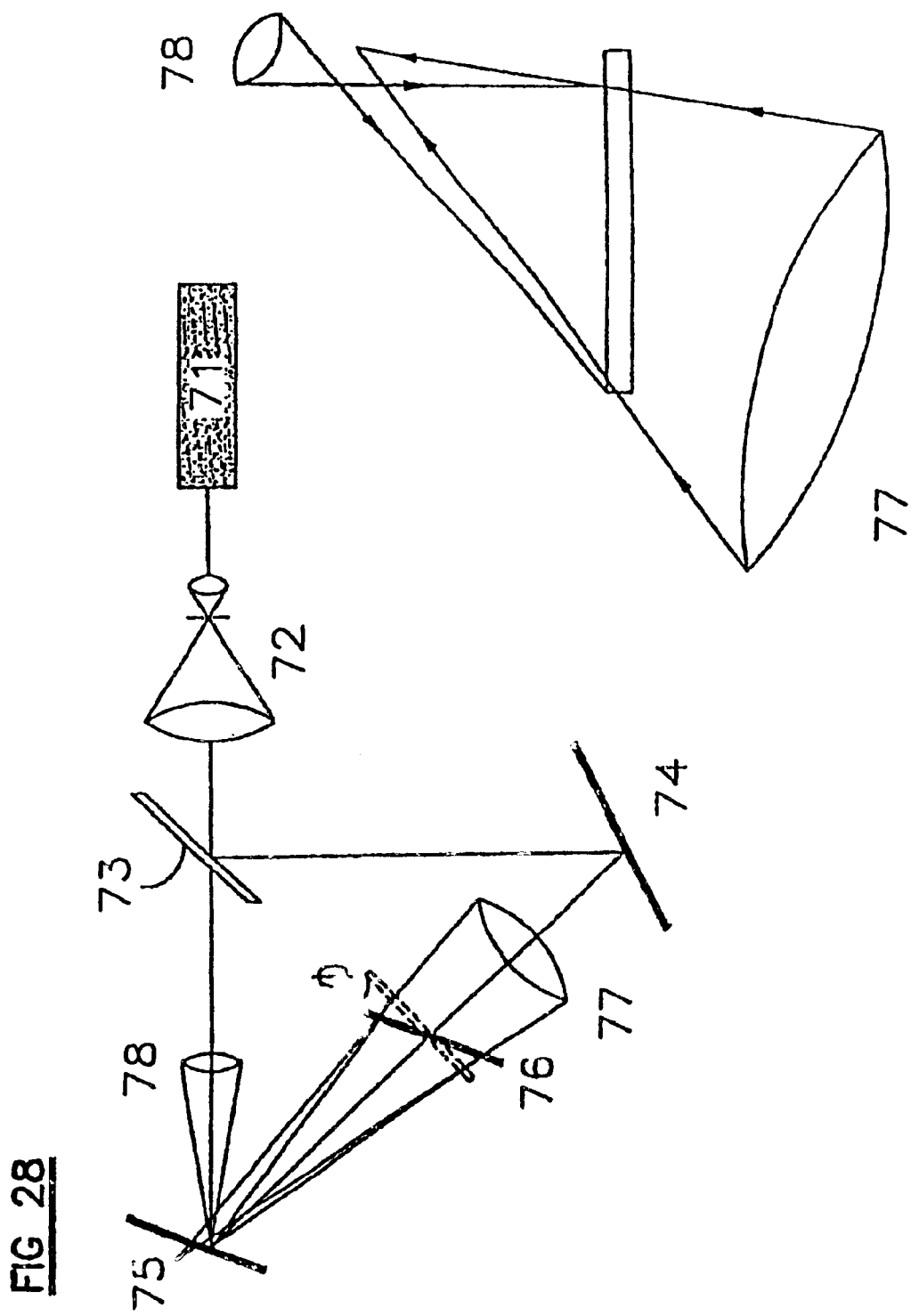
FIG. 28 is a diagram illustrating a method of recording a hologram for use in any of the embodiments.

FIG. 28 illustrates a method of making the hologram 32. A laser 71 supplies a beam to a telescopic system 72, comprising a spatial filter and lens arrangement, for expanding the laser beam. The output beam from the system 72 is split by a beamsplitter 73, for instance in the form of a half mirror. The reflected beam is directed to a mirror 74 whereas the transmitted beam is directed through a lens 78 to a mirror 75.

The mirrors 74 and 75 are angled such that, for embodiments in which the images 33 and 34 are superimposed on each other, the axes of the reflected beams are parallel and coincident. For embodiments in which the images 33 and 34 are relatively displaced, the axes of the beams reflected by the mirrors 74 and 75 intersect each other with a small offset angle such as 1.9° (defined by LCD size, projection optics and lateral displacement of input and output pupils).

The beam reflected by the mirror 74 is processed by a lens 77, for instance having a focus at 300 mm from the plane of a layer of material 76 for recording the hologram. The layer 76 is a plane layer and is rotated by a small angle (with respect to a direction parallel to the surface of the mirror 75. For instance, the offset angle may be equal to 9.6°. The mirror 75 reflects the beam and is then processed by the lens 78 which has to imitate the projection light source of the display. This function is performed by the lens 78 which, for example, has its focus at for example 300 mm on the same side of the layer 76 as the lens 77.

The specific angles and distances mentioned hereinbefore are appropriate for recording a hologram for use with an LCD having a 5 inch diagonal screen size and stripe configuration colour pixels. The hologram recorded in this way provides an offset of 10 mm between the images 33 and 34. The light source of the display is located at an optical distance of approximately 300 mm from the LCD.

The right side of FIG. 28 is a schematic diagram illustrating the recording geometry.

In order to form the hologram 32 for reflecting the full visible spectrum, three primary RGB colour laser lines may be used for recording individual holographic reflectors, one after the other. Suitable laser lines for recording such reflectors are:

blue mirror: Argon 457 nm or He—Cd 441 nm;

green mirror: Argon 515 nm or 532 nm;

red mirror: Krypton 647 nm or He—Ne 633 nm.

Suitable materials for the layer 76 and processing techniques for making the hologram 32 are disclosed in:

W. Gambogi, K. Steijn et al, "HOE Imaging in DuPont Holographic Photopolymers.", Proc.SPIE, vol. 2152, 1994;

S. Zager, A. M. Weber, "Display holograms in DuPont OmniDex films.", Proc.SPIE, vol. 1461, p. 58–67, 1991;

D. Tipton, M. Armstrong, S. Stivenson, "Improved Process of Reflection Holography replication and Heat Processing.", Proc.SPIE, vol. 2176, 1994;

T. Kobuta, "Control of reconstruction wavelength of Lippmann holograms recorded in Dichromated gelatine. Appl.Opt. vol. 28, p 1845–1849, 1989; and H. I. Bjelkhagen, "Silver-Halide Recording Materials for Holography and Their Processing.", Springer-Verlag, vol. 66. ISBN 3-540-56576-0, 1993.

Figure 4:
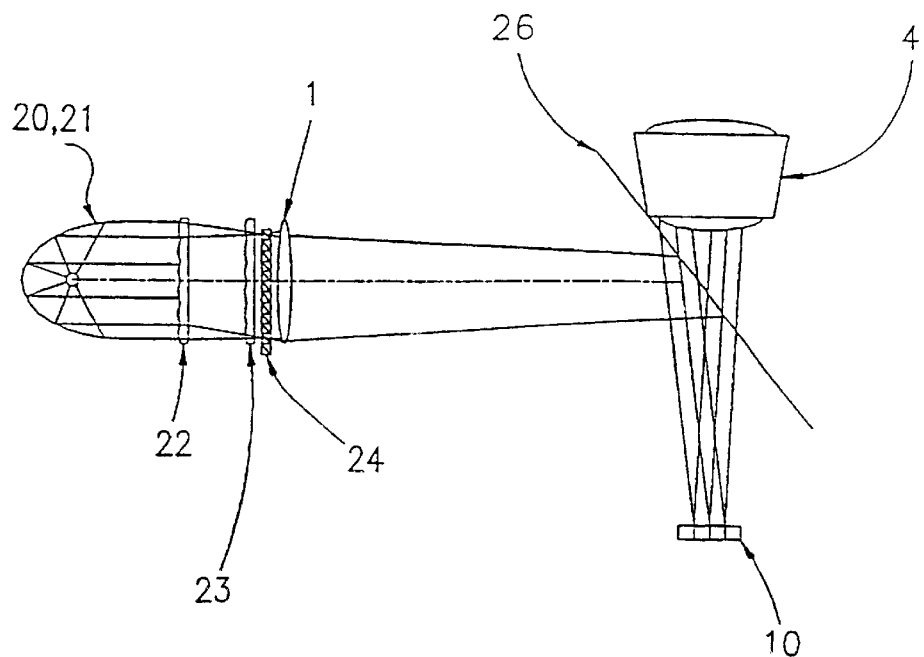
FIG. 4 is a diagram illustrating a known projection display.

The displays shown in FIGS. 29a and 29b use a reflective section, for example, of a type similar to that shown in FIG. 12 with an illumination system similar to that shown in FIG. 4. The display is shown in its working state in FIG. 29a. However, in order to provide a more convenient portable configuration, the display may be collapsed or folded into the state shown in FIG. 29b. It is thus possible to provide a portable projection system having a high lumens output with a small volume for carrying. In its operating state, the display may be of relatively large size, for example having an optical volume of 2 liters. In its portable state, the use of the hologram 32 allows the volume to be reduced to, for example, <1 liter.

It is also possible to provide a display of this type in a transflective optical arrangement. Transflective displays are known and have both a reflective (direct view) mode and a transmission (direct view) mode.

Figure 30:
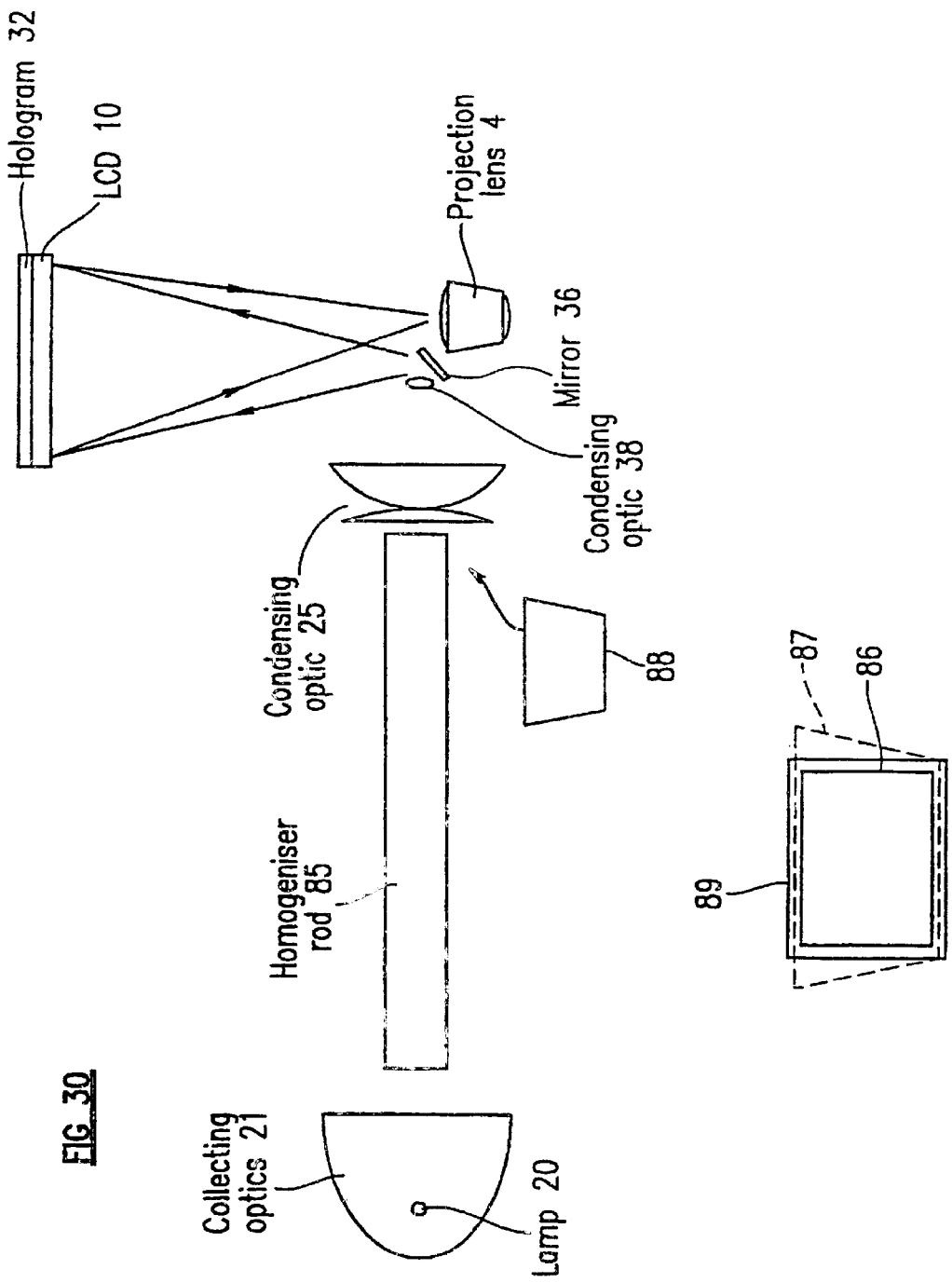
FIG. 30 illustrates a display of the type shown in FIGS. 29a and 29b using a different type of homogeniser.

FIG. 30 illustrates a display of the type shown in FIGS. 29a and 29b but in which the homogenising optical arrangement is replaced by a homogeniser rod 85. The rod 85 receives the illuminating light from the collecting optic 21 and supplies this to the condensing optic 25.

In the absence of any correction, the LCD surface shown at 86 would receive illumination as illustrated at 87. However, by tapering at least one end of the rod 85 to provide an output cross-section as shown at 88, more uniform illumination as illustrated at 89 is possible.

Figure 31A:
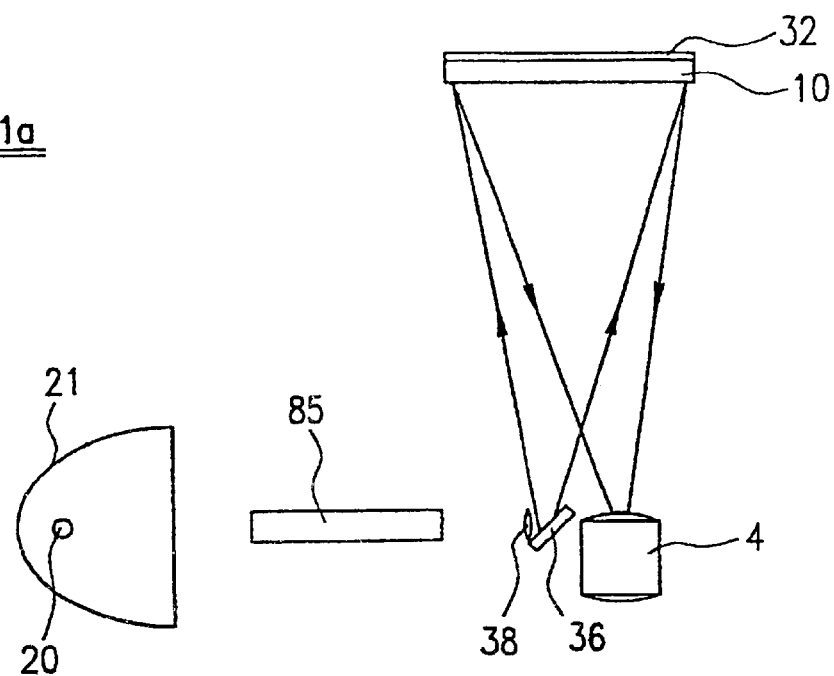
FIGS. 31a and 31b illustrate displays of the type shown in FIGS. 29a and 29b using a scattering type of LCD.
Figure 31B:
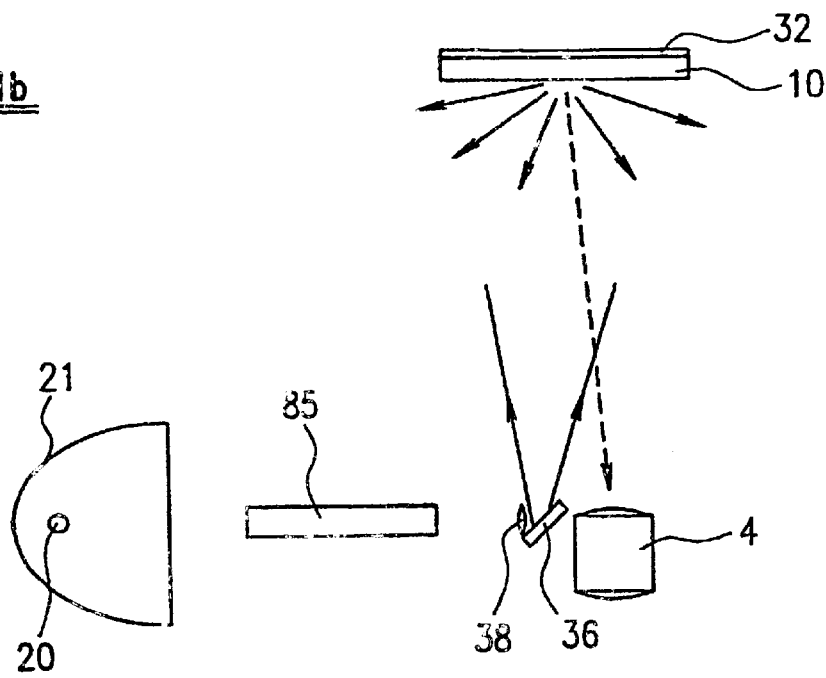

FIGS. 31a and 31b illustrate displays of the type shown in FIG. 30 but in which the LCD 10 is of the type which has transparent and scattering modes. As shown in FIG. 31a, the optical performance is similar to that illustrated in FIG. 30 when the LCD 10 is in its transmissive mode. Light reflected from the hologram 32 is directed to the projection lens 4. The scattering mode is illustrated in FIG. 31a. In this mode, light incident on the LCD 10 is scattered in all directions so that very little light is directed to the projection lens 4. It is thus possible to achieve a high contrast performance. Also, because LCDs 10 having scattering modes are polarisation independent, polarisation conversion optics are unnecessary so that the etendue of the system is maintained.

Figure 32:
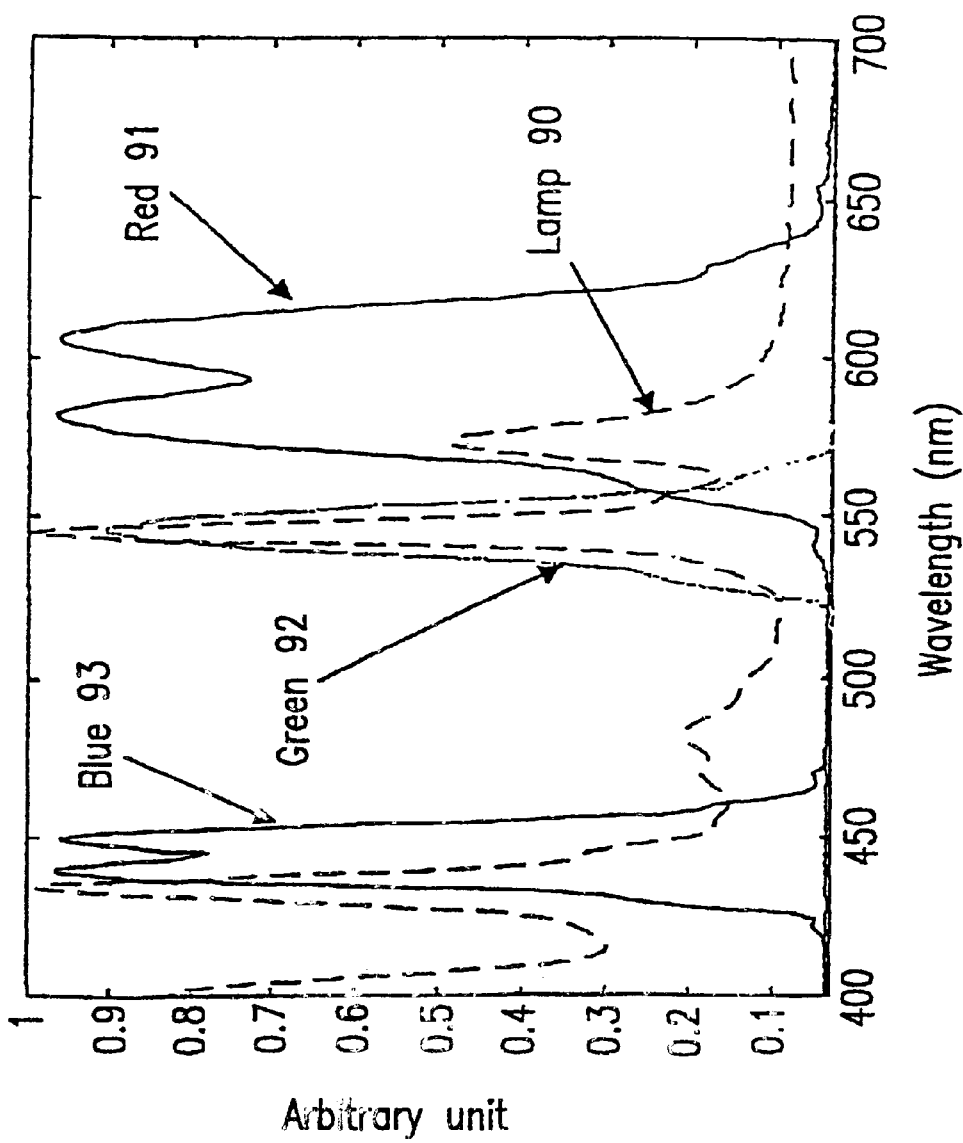
FIG. 32 is a graph in arbitrary units against wavelength illustrating the spectral performance of a lamp and of holographic colour filter elements.

FIG. 32 illustrates at 90 the spectral performance of a typical lamp 20 for use with the displays described hereinbefore. With the hologram 32 providing colour filtering, the performance of red, green and blue reflective elements of the hologram are illustrated at 91, 92 and 93, respectively. The reflection spectra of the hologram may thus be tuned so as to overlap the output spectral features of the lamp so as to maximise output brightness of the display.

INDUSTRIAL APPLICABILITY

According to the present invention as set forth above, it is thus possible to provide a projection display which makes use of a transmissive spatial light modulator such as an LCD and which reduces or overcomes disadvantages of known displays of this type. The hologram can be recorded in such a way that it performs an imaging function which is compensated at least partly for aberrations so as to provide improved display quality. For instance, first order correction for aberrations during recording can provide a substantially uniform reflection with uniform illumination across the whole image. Also, the hologram may be relatively thin so that parallax errors are uniform across the image and illumination uniformity is maintained.

It is also possible to provide a projection system using a relatively large LCD panel with a compact illumination system. This has the advantage of allowing a relatively large pixel size at high resolutions, thus maximising the aperture ratio of the individual pixels. Hence it is possible to produce a compact, high efficiency projection system. Unwanted diffraction effects from very small pixels that are found in high resolution small panels are minimised. The holographic field element gives a flat image plane of the LCD so that the Modulation transfer function (MTF) of the projection system is maintained.

What is claimed is:

1. A projection display comprising: a transmissive spatial light modulator; an illuminator for illuminating the modulator from the front thereof; and a reflection hologram disposed at the rear of the modulator for imaging and reflecting back through the modulator light from the illuminator received through the modulator.

2. A display as claimed in claim 1, wherein the reflection hologram is arranged to form an image of part of the illuminator in front of the modulator.

3. A display as claimed in claim 1, wherein the reflection hologram is arranged to perform the functions of a reflector and an off-axis lens with aberration correction.

4. A display as claimed in claim 1, wherein the reflection hologram is arranged to perform the functions of a reflector which is pixellated to corresponding with the pixellation of the transmissive spatial light modulator.

5. A display as claimed in claim 1, wherein the reflection hologram is a volume reflection hologram.

6. A display as claimed in claim 5, wherein the reflection hologram comprises at least three regions for reflecting and imaging light of respective primary colours.

7. A display as claimed in claim 6, wherein the at least one of the three regions are continuous layers.

8. A display as claimed in claim 1, further comprising four sub-pixel (RGBY) sets corresponding to red (R), green (G), blue (b), and luminance (Y), respectively.

9. A display as claimed in claim 1, wherein the illuminator comprises a light source and a first condensing optic for forming an image of the light source at a first location.

10. A display as claimed in claim 9, wherein the reflection hologram is arranged to form an image of the light source at a second location which is spaced from the first location.

11. A display as claimed in claim 10, wherein the second location is laterally spaced from the first location.

12. A display as claimed in claim 10, wherein the first and second locations are laterally offset with respect to the modulator.

13. A display as claimed in claim 10, further comprising a projection optic for forming an image of the modulator on a screen.

14. A display as claimed in claim 13, wherein the projection optic has an entrance pupil disposed substantially at the second location.

15. A display as claimed in claim 9, wherein the illuminator comprises a field stop associated with the first condensing optic and a second condensing optic for imaging the field stop on the modulator.

16. A display as claimed in claim 1, further comprising a turning optic for turning light from the illuminator towards the modulator.

17. A display as claimed in claim 16, wherein the turning optic comprises a half mirror.

18. A display as claimed in claim 16, wherein the turning optic comprises a reflecting prism.

19. A display as claimed in claim 18, wherein the prism is arranged to turn light from the modulator.

20. A display as claimed in claim 1, further comprising a turning optic for turning light from the illuminator towards the modulator,
   wherein the illuminator comprises a light source and a first condensing optic for forming an image of the light source at a first location,
   wherein the reflection hologram is arranged to form an image of the light source at a second location which is spaced from the first location,
   wherein the turning optic comprises a reflecting prism which is arranged to turn light from the modulator, and
   wherein the first and second locations are disposed substantially at respective adjacent surfaces of the reflecting prism.

21. A display as claimed in claim 9, wherein the illuminator comprises a homogeniser disposed between the light source and the first condensing optic.

22. A display as claimed in claim 21, wherein the illuminator comprises a polarisation converter optic disposed between the homogeniser and the first condensing optic.

23. A display as claimed in claim 9, wherein the light source comprises at least one light emitter and collecting optic.

24. A display as claimed in claim 23, wherein the collecting optic comprises a mirror.

25. A display as claimed in claim 23, wherein the light source comprises respective primary colour light emitters.

26. A display as claimed in claim 1, wherein the modulator comprises a liquid crystal device.

27. A display as claimed in claim 26, wherein the liquid crystal device comprises a rear substrate, a liquid crystal layer, and a rear polariser disposed between the rear substrate and the liquid crystal layer, the reflection hologram being disposed between the liquid crystal layer and the rear substrate.

28. A display as claimed in claim 27, wherein a glass layer is disposed between the liquid crystal layer and the reflection hologram.

29. A display as claimed in claim 1, wherein the modulator comprises a rear polariser.

30. A display as claimed in claim 29, wherein the rear polariser comprises first and second polarisers and the reflection hologram is disposed between the first and second polarisers.

31. A display as claimed in claim 1, further comprising a first polariser for supplying incident light with a first polarisation from the illuminator to the modulator and a second polariser for passing light reflected from the modulator with a second polarisation substantially orthogonal to the first polarisation.

32. A display as claimed in claim 1, further comprising a polarising beam splitter for reflecting incident light with a first polarisation from the illuminator to the modulator and for passing light reflected from the modulator with a second polarisation substantially orthogonal to the first polarisation.

33. A display as claimed in claim 1, wherein the modulator comprises a front polariser and waveplate.

34. A display as claimed in claim 1, wherein the modulator comprises a plurality of picture elements, each of which is switchable between a light transmissive mode and a light scattering mode.

35. A display as claimed in claim 1, further comprising a backlight for illuminating the modulator through the reflection hologram to provide a direct viewing display mode.

* * * * *

UNITED STATES PATENT AND TRADEMARK OFFICE
CERTIFICATE OF CORRECTION

PATENT NO.     : 6,595,648 B1
DATED          : July 22, 2003
INVENTOR(S)    : Graham John Woodgate et al.

It is certified that error appears in the above-identified patent and that said Letters Patent is hereby corrected as shown below:

<u>Title page,</u>
Item [75], please add the Inventor -- Jason Slack, Cambridge (GB) --.

Signed and Sealed this

Thirtieth Day of December, 2003

JAMES E. ROGAN
*Director of the United States Patent and Trademark Office*